United States Patent [19]

Shinbori

[11] Patent Number: 5,734,328
[45] Date of Patent: Mar. 31, 1998

[54] APPARATUS FOR SWITCHING COMMUNICATION METHOD BASED ON DETECTED COMMUNICATION DISTANCE

[75] Inventor: Kenichi Shinbori, Kanagawa-ken, Japan

[73] Assignee: Canon Kabushiki Kaisha, Tokyo, Japan

[21] Appl. No.: 355,676

[22] Filed: Dec. 14, 1994

[30] Foreign Application Priority Data

Dec. 28, 1993 [JP] Japan .................. 5-337135

[51] Int. Cl.⁶ .................................. H04B 1/58
[52] U.S. Cl. .................. 340/825.06; 395/200.62; 307/37; 307/71; 359/159; 359/155; 341/100; 341/101
[58] Field of Search ................. 307/37, 71; 359/159, 359/165, 154, 155; 341/100, 101; 340/825.06, 825.44, 825.57, 825.69; 395/200.5, 200.57, 200.62, 200.66, 200.76

[56] References Cited

U.S. PATENT DOCUMENTS

| | | | |
|---|---|---|---|
| H610 | 3/1989 | Focarile et al. | 340/825.44 X |
| 4,728,930 | 3/1988 | Grote et al. | 341/101 |
| 4,851,820 | 7/1989 | Fernandez | 340/825.44 |
| 4,890,224 | 12/1989 | Fremont | 395/831 |
| 5,075,792 | 12/1991 | Brown et al. | 359/154 X |
| 5,093,879 | 3/1992 | Bregman et al. | 359/154 X |
| 5,189,543 | 2/1993 | Lin et al. | 359/154 X |
| 5,231,514 | 7/1993 | Nakamura | 358/444 |
| 5,293,236 | 3/1994 | Adachi et al. | 348/231 |
| 5,379,033 | 1/1995 | Fujii et al. | 340/825.69 |

FOREIGN PATENT DOCUMENTS

| | | | |
|---|---|---|---|
| 0390421 | 10/1990 | European Pat. Off. | H04N 3/15 |
| 0422447 | 4/1991 | European Pat. Off. | H04N 5/225 |
| 4239279 | 1/1993 | Japan | H04N 5/91 |
| 5233426 | 12/1993 | Japan | G06F 12/02 |

*Primary Examiner*—Michael Horabik
*Assistant Examiner*—William H. Wilson, Jr.
*Attorney, Agent, or Firm*—Robin, Blecker, Daley and Driscoll

[57] ABSTRACT

A communication apparatus comprising: a spatial communication circuit having a transmission part and a reception part; and a detection part for detecting the separate positional state from a communication partner apparatus. The communication method by the spatial communication circuit is switched according to the detection result of the detection part.

43 Claims, 17 Drawing Sheets

APPARATUS 3

APPARATUS 2

APPARATUS FOR SWITCHING COMMUNICATION METHOD BASED ON DETECTED COMMUNICATION DISTANCE

BACKGROUND OF THE INVENTION

1. Field of the Invention

The present invention relates to a communication apparatus having spatial communication means and, more particularly, to a communication apparatus suitable for wireless signal transmission using light such as infrared rays.

2. Description of the Related Art

Conventionally, personal information processing apparatuses (e.g., handy personal computers) have been often used in a stand-alone mode. In recent years, however, such apparatuses have been more often used in a mode in which information is transferred between system apparatuses such as a printer and a host computer.

Incidentally, in the case of transferring information between apparatuses, the information processing apparatuses need to be connected with other system apparatuses. Especially in information processing apparatuses connected to other apparatuses, there exists a problem that when such apparatuses are connected to one another with connector cables, it is troublesome to change the connection of the connector cables if the system is re-arranged, impairing the operability and convenience of the apparatuses.

Moreover, the number of insertions and removals of the cables is limited, and contact failure is caused if the connectors are inserted and removed too many times. As a result, if signals are transmitted through connector cables, the reliability of information may be dropped, resulting in failure or missing of data. In order to solve these problems, therefore, there has been proposed an apparatus for wireless signal transmission using light such as infrared ray.

FIGS. 1 and 2 are block diagrams showing two examples of construction of conventional information processing apparatuses for wireless signal transmission.

In FIGS. 1 and 2, an apparatus 100 and the other apparatus 200 are assumed to have identical functions, only for simplicity of description. Here will be described the operations of these apparatuses 100 and 200.

The apparatus 100 shown in FIG. 1 (or the apparatus 200 shown in FIG. 2) has its external memory 101 (201) comprising a recording medium such as an IC memory card, a hard disk or a magneto-optic disk, and is removably loaded into the apparatus 100 (or the apparatus 200). A data input part 102 (202) includes a mouse or a keyboard.

Either text data stored in advance in the aforementioned external memory 101 (201) or text data inputted from the aforementioned data input part 102 (202) is encoded by a memory interface (memory I/F) 103 (203), and then written in a predetermined storage area of an internal memory 105 (205) by the control of a memory controller 104 (204).

Moreover, the data thus encoded by the aforementioned memory I/F 103 (203) is converted into a drive waveform suited for display by a display IC 106 (or 206) and a display driving circuit 107 (207), and displayed on a display part 108 (208).

Incidentally, a series of sequence controls described above are executed by a system controlling CPU 115 (215) in accordance with the program stored in advance in a ROM 116 (216) by using a RAM 117 (217) as a work memory.

Next, here will be described the operation in the case in which text data stored in the internal memory 105 of one apparatus 100 described above is transferred to the other apparatus 200.

Specifically, when the apparatus 200 is in its standby state, that is, can receive data, and when a data transfer mode is set by the user using an operation part 109 of the apparatus 100 comprising a change-over switch, the text data stored in the internal memory 105 is read out by the memory controller 104.

The text data thus read out are fed to a data transfer interface (data transfer I/F) 110, and converted into codes proper for data transfer. Address control codes and the like are attached to the coded data, and the resultant data are transmitted to a parallel/serial conversion circuit 111.

The text data inputted to the parallel/serial conversion circuit 111 are generally parallel data having an alphabet code of 1 byte consisting of 8 bits and a kanji character code of 2 bytes each consisting of 8 bits. The parallel data are converted into serial data by the parallel/serial conversion circuit 111.

Next, the serial data thus converted are further converted by a light emitting/receiving system driving circuit 112 into an electric current suited for driving a light emitting element 113' such as an infrared light emitting diode. Moreover, the electric signal of the serial data thus converted is transferred as an infrared light signal from the light emitting element 113' of one apparatus 100 to the other apparatus 200.

On the side of the apparatus 200, the light signal thus transmitted from the apparatus 100 is received by a light receiving element 214' such as a photodiode, and photoelectrically converted. The electric signal thus obtained by the photoelectric conversion is amplified by a light emitting/receiving system driving circuit 212, and simultaneously the waveform is shaped by a not-shown shaping circuit. The waveform-shaped signal is then converted into parallel data by a parallel/serial conversion circuit 211.

The parallel data thus obtained are subjected by a data transfer I/F 210 to the reverse processing to that of the data transfer I/F 110 of the aforementioned apparatus 100, and converted to codes suited for the internal processings of the other apparatus 200.

Moreover, the code-converted parallel data are stored in a predetermined storage area of the internal memory 205 by the control of the memory controller 204, then converted to a signal having a drive waveform suited for the display by the display IC 206 and the display driving circuit 207, and displayed on the display part 208.

When the parallel data thus transferred need to be recorded as a file, they are stored in the external memory 201 through the memory I/F 203 in accordance with the operation of an operation part 209 by the user.

In the prior art, the data transferred between the apparatus, as described above, are generally text data, so that data of a piece of manuscript paper (20×20 Japanese characters) can be transferred for one second or less at a transfer rate of about 1,200 to 9,600 bps of the RS-232C standard. As a result, the transfer rate is sufficient in view of the convenience of the user even if the data are transferred by serial communication.

When the data transfer rate is about 9,600 bps, it is possible to construct an apparatus by using very inexpensive elements in view of the driving frequency of the light emitting element 113' and a light emitting element 213' and the response speed of light receiving elements 114' and 214'. Moreover, there exists no problem that the power consumption and the heat generation are so high that the load on the elements is too heavy.

In recent years, however, with the spread of multimedia information processing apparatuses, there arises a need of transferring not only text data but also information such as sound data or image data between apparatuses.

Assume that a video signal obtained from an image pickup element having about four hundred thousand pixels be digitally transferred at a rate of 30 frames/sec. as color image data of 10 bits in the modes of three signals, a luminance signal Y and color-difference signals R-Y and B-Y at a ratio of these signals of 4:2:2. In this case, the data transfer rate is given by:

(10 bits)×(4:2:2)×(14.3 Mpixels/sec.)=286 Mbps.

When in order to reduce the amount of data transferred, the compression ratio is so set to a certain level, say, 1/3 as to allow reversible compression/expansion and compression encoding such as DPCM (Differential Pulse Code Modulation) is effected, the transfer rate is reduced to 100 Mbps in terms of serial data.

Incidentally, a still image is required to have a higher quality than that of at least a moving image, from the standpoint of ease of watching. Here, the amount of data of a digital still image of one picture the Hi-Vision picked up by an RGB three-CCD camera of an image pickup element having, e.g., about two million pixels is calculated as follows:

(10 bits)×(2,000,000)×3=60 Mbits.

If, moreover, this data is compression-encoded at a compression ratio of 1/3, the amount is reduced to about 20 Mbits. Incidentally, this amount of data of the still image is considered to increase with the future needs of higher image quality.

On the other hand, less expensive light emitting elements such as light emitting diodes and less expensive light receiving elements such as photodiodes can be used when the driving frequency is lower, the response speed is lower and the shorter communication distance between them is shorter. As is well known in the art, moreover, little consideration is required for the power consumption and the heat generation, and the construction of the electric circuit and the mounting structure are simple.

Of course, the optical communication semiconductor laser using optical fibers and the pin-photodiodes can be driven with a frequency of 100 MHz or higher. In the optical communication method for transferring wirelessly information, however, it is not proper to drive the elements with high frequencies if the influences of the semiconductor laser upon the human eyes or the narrowed angle of directivity are considered.

As a result, infrared light emitting diodes and photodiodes are generally used for wireless optical communications. The driving frequency of the light emitting elements of this case are varied with the communication distance or the disturbances of external light. Even if the emission ion intensity is increased by using a plurality of light emitting elements so as to increase the reach of the light, the practical limit is usually about 1 to 10 MHz.

With such driving frequencies, however, it is very difficult to satisfy the transfer rate of about 100 Mbps of the aforementioned moving image data. In order to ensure the aforementioned transfer rate of about 100n Mbps, therefore, it is necessary either to increase the compression ratio to more than thereby to decrease the amount of data or to decrease the number of frames to be processed for every second. This raises another problem that the image quality is degraded and therefore the image is undesirable as a moving image.

Even in cases where a still image having the aforementioned data amount of about 20 Mbits is transferred, it takes about 2 to 30 seconds to transfer the data, causing a problem of deteriorating the convenience and operability of the apparatus.

This problem rises not only in light signal transmitting means but also in spatial transmission means using electromagnetic waves or sound waves such as ultrasonic waves which have a directivity of a certain degree.

SUMMARY OF THE INVENTION

An object of the present invention is to provide a high-performance electronic apparatus.

Another object of the present invention is to provide a communication apparatus enabling reliable communication.

Still another object of the present invention is to provide a transmitting apparatus capable of performing excellent signal transmission.

A further object of the present invention is to provide a receiving apparatus capable of performing excellent signal reception.

A further object of the present invention is to provide a transmitting and receiving apparatus capable of performing excellent signal transmissions and reception.

In order to achieve the above-specified objects, one embodiment of a communication apparatus of the present invention is provided with a communication means having a transmission part, and/or a reception part, detection means for detecting the propriety of the state of communication with the apparatus of a partner, and switch means for switching the communication method of the communication means in accordance with the detection result of the detection means.

Another embodiment of an electronic apparatus of the present invention is provided with communication means for communicating with another apparatus, detection means for detecting the communication distance to the apparatus with which the communication means communicates, and switch means for switching the communication method by the communication means in accordance with the detection output of the detection means.

Still another embodiment of a transmitting apparatus of the present invention is provided with transmission means for transmitting a signal to another apparatus, detection means for detecting the transmission distance to the apparatus to which a signal is transmitted by the transmission means, and switch means for switching the communication method by the transmission means in accordance with the detection output of said detection means.

A further embodiment of a receiving apparatus of the present invention is provided with reception means for receiving a signal from another apparatus, detection means for detecting the transmission distance to the apparatus which transmits the signal received by the reception means, and switch means for switching the communication method by the reception means in accordance with the detection output of the detection means.

A further embodiment of a transmitting/receiving apparatus of the present invention is provided With transmission means for transmitting a signal to another apparatus, reception means for receiving a signal from said apparatus, detection means for detecting the communication distance to the apparatus to which or from which a signal is transmitted or received by the transmission means or by the reception means, and switch means for switching the communication method by the transmission means or the reception means in accordance with the detection output of the detection means.

Because of the above-specified construction, there can be produced an effect that the signal transfer time can be drastically shortened to transfer massive information quickly and reliably. Another effect is that the apparatus has a reduced size and is manufactured at low cost. A further effect is that the apparatus can be very easily operated.

DETAILED DESCRIPTION OF THE PREFERRED EMBODIMENTS

One embodiment of the present invention will be described with reference to the accompanying drawings.

Figure 1:
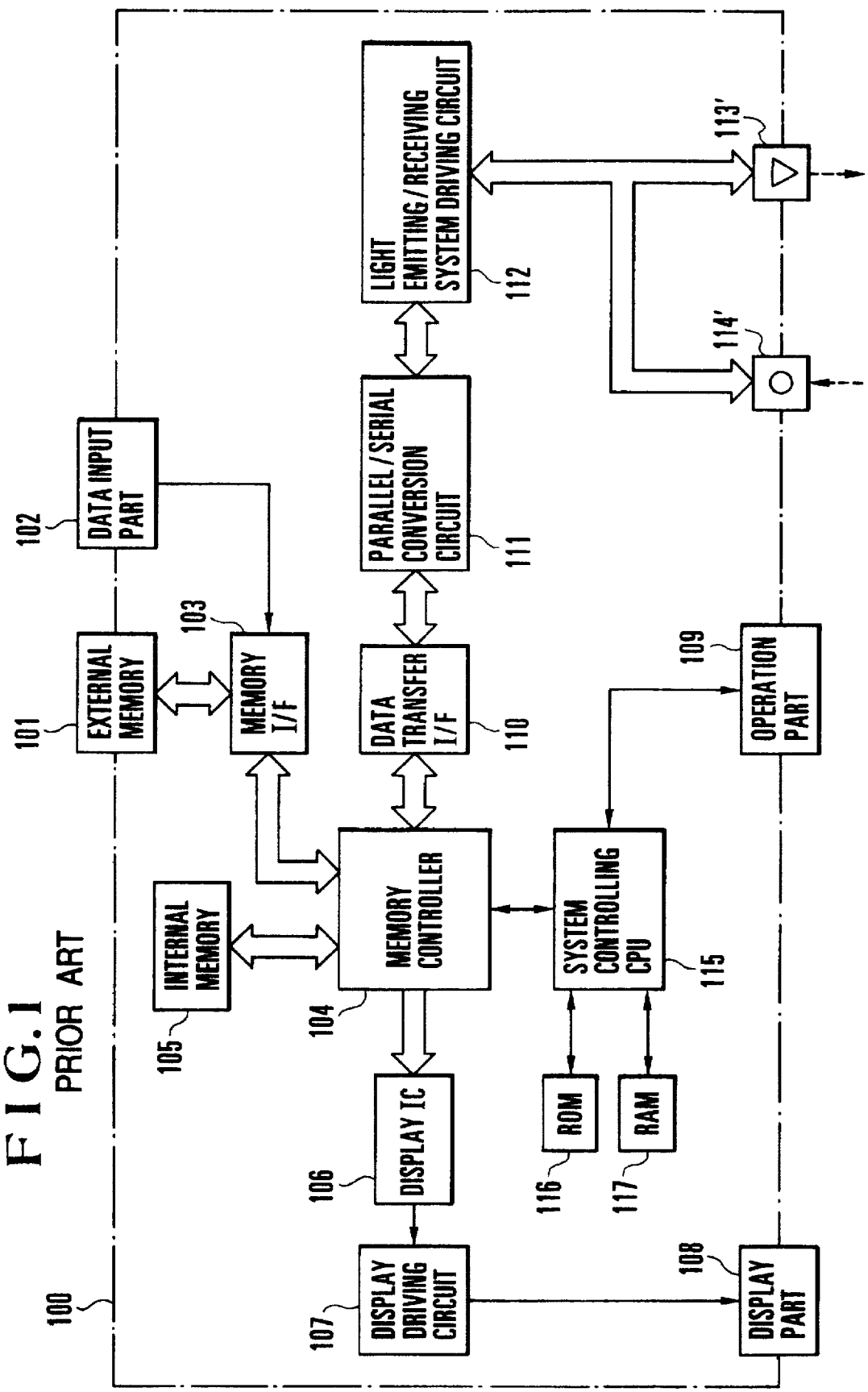
FIG. 1 is a circuit block diagram of a conventional information processing apparatus.
Figure 2:
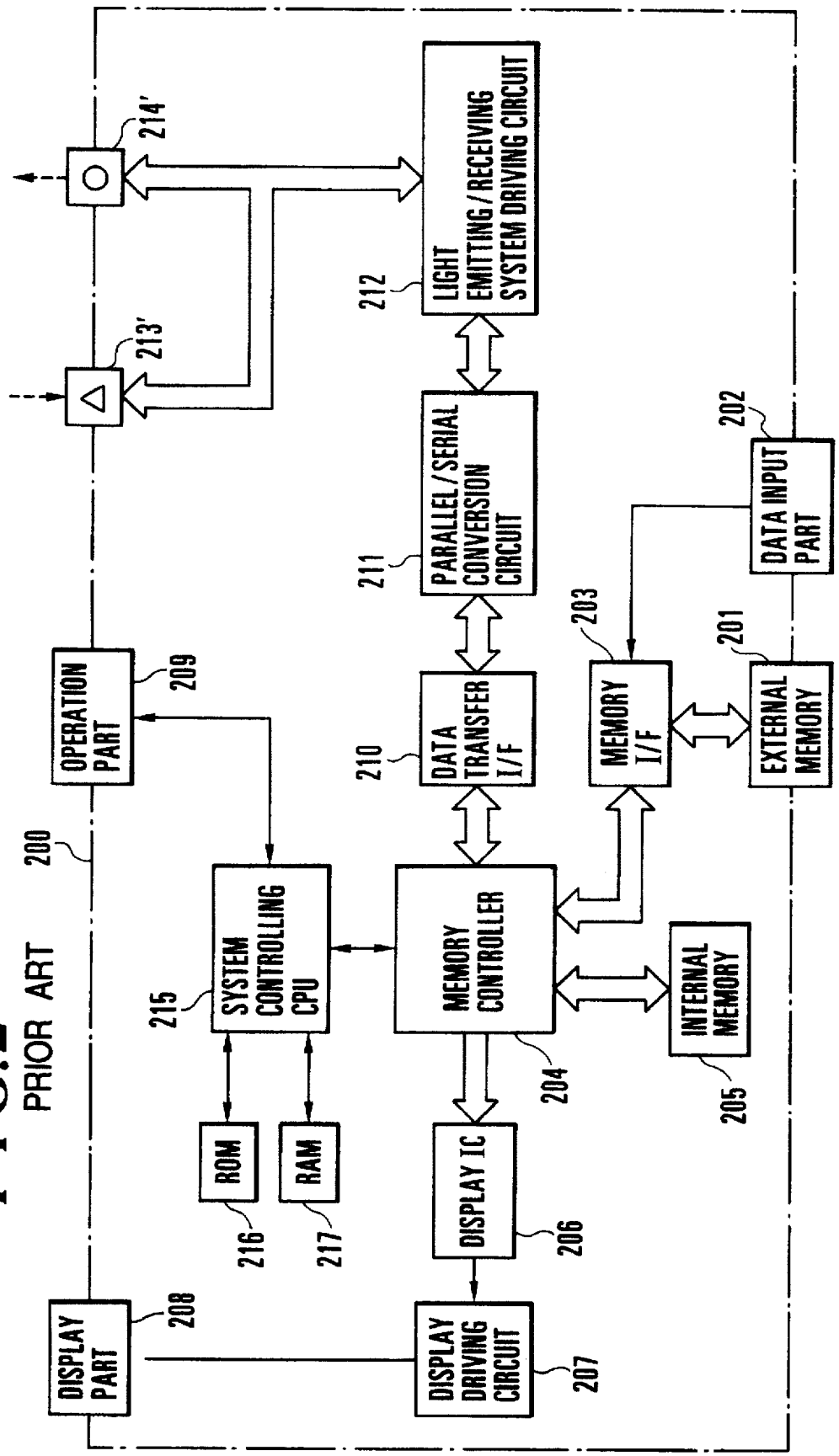
FIG. 2 is a circuit block diagram of the conventional information processing apparatus.
Figure 3:
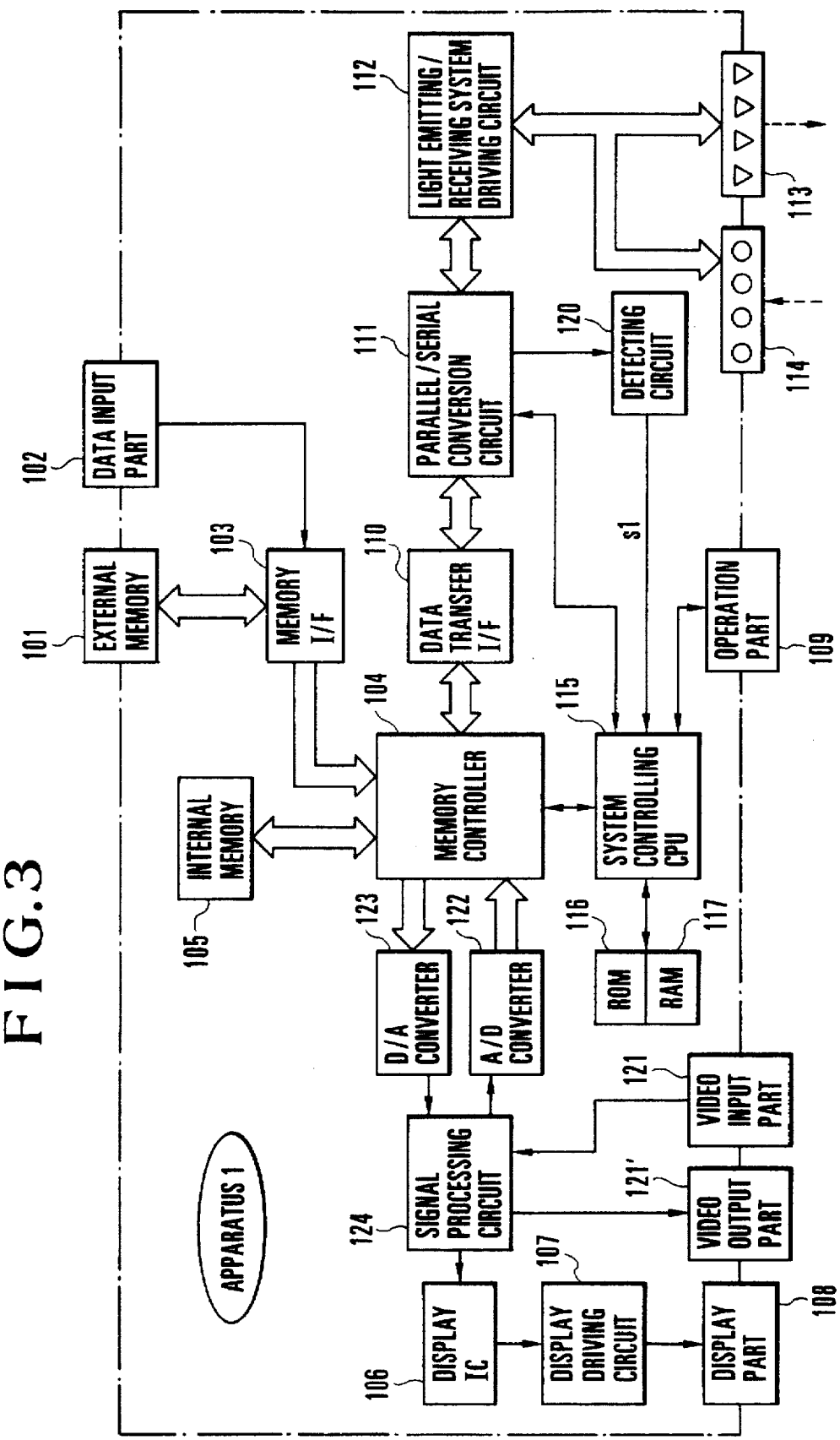
FIG. 3 is a circuit block diagram of an information processing apparatus (first apparatus) according to a first embodiment of the present invention.
Figure 4:
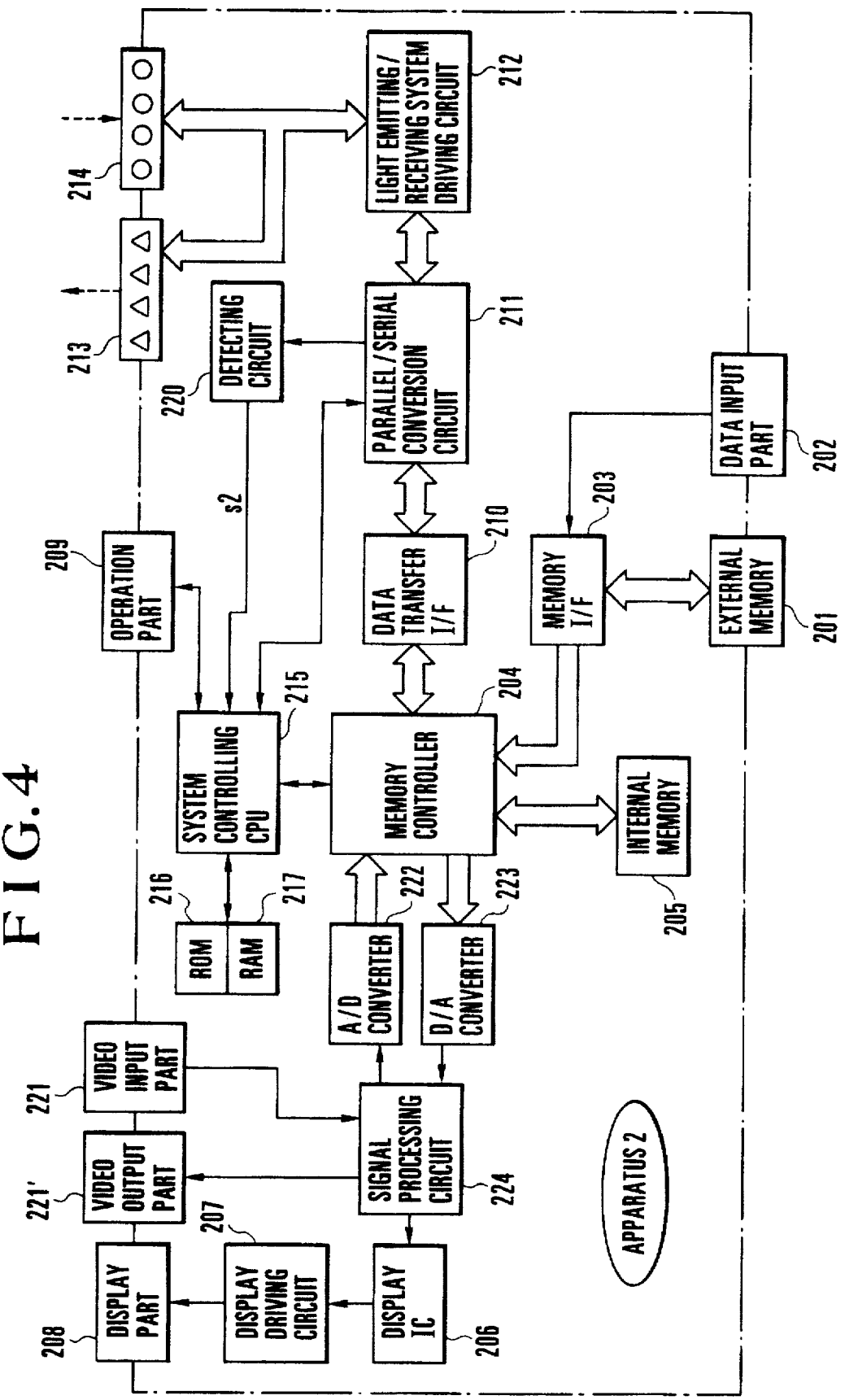
FIG. 4 is a circuit block diagram of an information processing apparatus (second apparatus) according to the first embodiment of the present invention.
Figure 5:
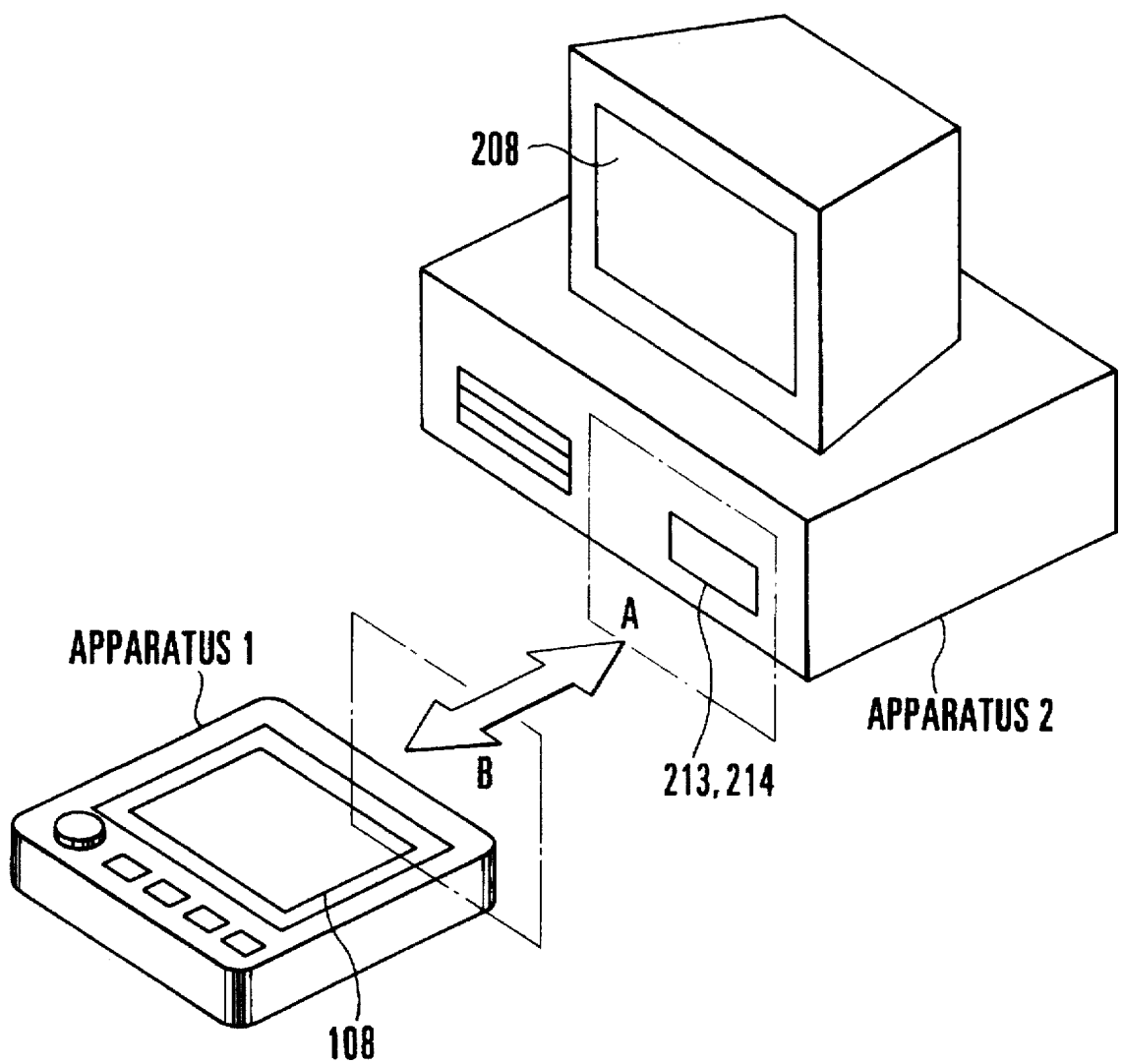
FIG. 5 is an appearance perspective view showing one example of the information processing apparatus (i.e., the first apparatus and the second apparatus) according to the first embodiment.

FIGS. 3 to 10 are diagrams showing a first embodiment of an apparatus having light signal transmission means of the present invention. Of these, FIGS. 3 and 4 are circuit block diagrams of an information processing apparatus according to the present invention, and FIG. 5 is an appearance perspective view showing one example of the information processing apparatus.

Figure 6:
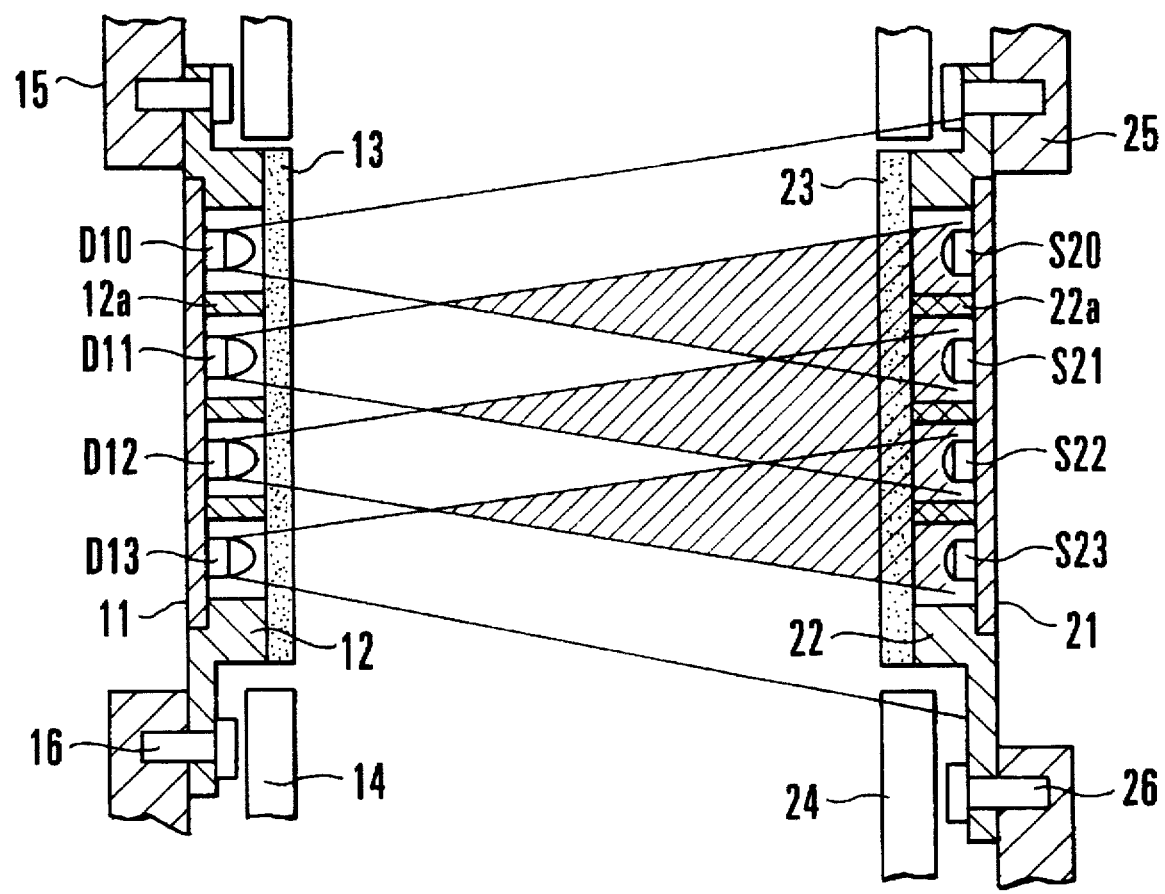
FIG. 6 is a section of light signal transmission means and shows the positional relations of light receiving elements to the emitted light beams of light emitting elements in accordance with the distance between the first apparatus and the second apparatus shown in FIG. 5.
Figure 7:
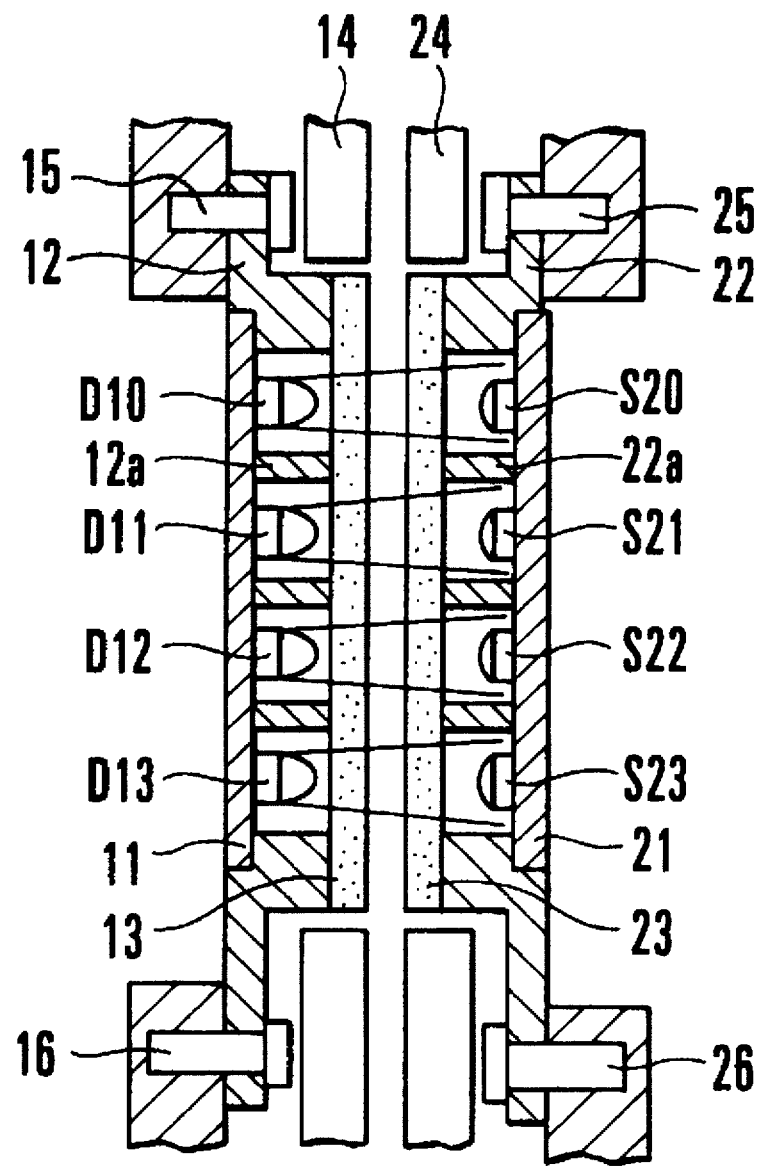
FIG. 7 is a section of light signal transmission means and shows the positional relations of the light receiving elements to the emitted light beams of the light emitting elements in accordance with the distance between the first apparatus and the second apparatus shown in FIG. 5.
Figure 8:
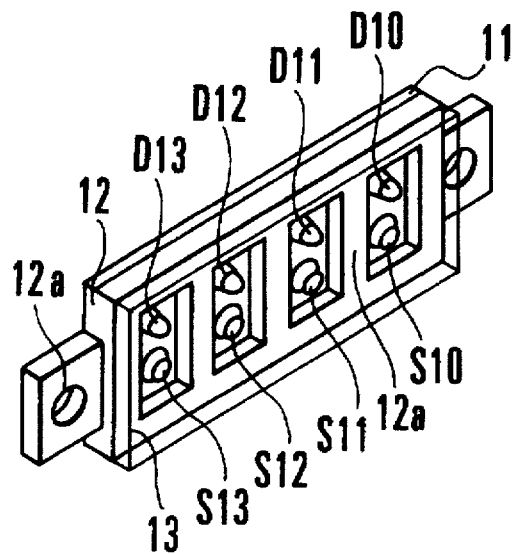
FIG. 8 is a perspective view of the light signal transmission means according to the first embodiment.
Figure 9:
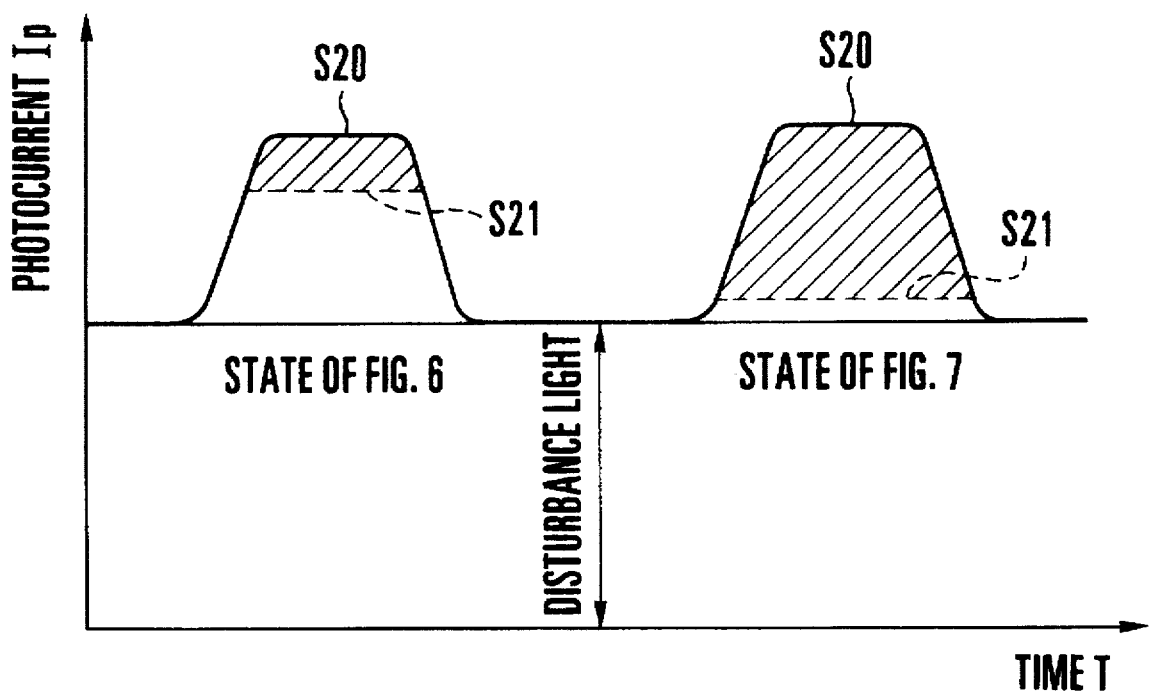
FIG. 9 is a characteristic diagram showing the result of the photo-electric conversion by the light receiving elements in the state shown in FIG. 7.
Figure 10:
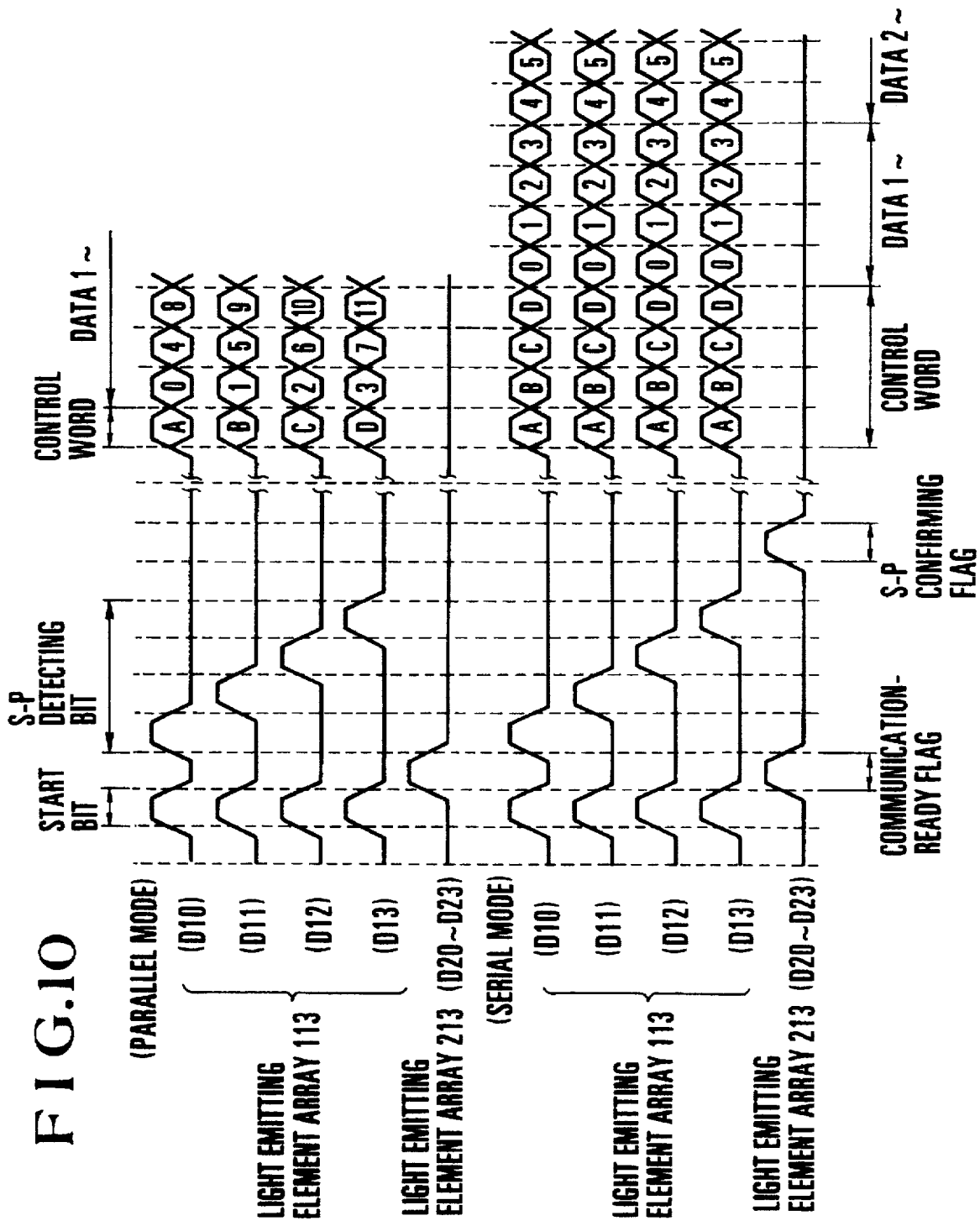
FIG. 10 is a timing chart illustrating the protocol of the light signal transmission means according to the first embodiment.

Moreover, FIGS. 6 and 7 are sections of the light signal transmission means and show the positional relations of light receiving elements to the emitted light beams of light emitting elements in accordance with the distance between the first apparatus and the second apparatus shown in FIG. 5; FIG. 8 is a perspective view of the light signal transmission means of the present embodiment; FIG. 9 is a characteristic diagram showing the result of the photo-electric conversion by the light receiving elements in the state shown in FIG. 7; and FIG. 10 is a timing chart illustrating the protocol of the light signal transmission means of the present embodiment.

In FIGS. 3 and 4, for simplicity of description, the first apparatus 1 and the second apparatus 2 are assumed to have identical functions, but they may have different functions. Here will be described the operations of the first apparatus 1 and the second apparatus 2.

An external memory 101 (201) of the first apparatus 1 shown in FIG. 3 (or the second apparatus 2 shown in FIG. 4) is a recording medium, such as an IC memory card, a hard disk or a magneto-optic disk, which is removably loaded into the first apparatus 1 (the second apparatus 2).

The image data stored in advance in the aforementioned external memory 101 (201) is written as a binary digital signal of 8 or 10 bits in a predetermined storage area of an internal memory 105 (205) by the control of a memory I/F 103 (203) and a memory controller 104 (204).

A video signal inputted from a video input part 121 (221) is fed to a signal processing circuit 124 and is subjected to signal gain adjustment, gamma correction and color separation (for generating a Y signal and an R-Y/B-Y signal) so that it is adjusted to a necessary level and necessary characteristics. Incidentally, the aforementioned video input part 121 (221) is constructed of a connector to be electrically connected to an external apparatus (not shown) such as a video camera or a TV set.

The video signal thus processed is converted into a digital signal of 8 or 10 bits by an A/D converter 122 (222) and is then written as a binary digital signal in a predetermined storage area of the internal memory 105 (205) by the control of the memory controller 104 (204).

The digital signal written in the aforementioned internal memory 105 (205) is read out by the memory controller 104

(204), fed to a D/A converter 123 (223), and converted into an analog signal. And, this analog signal is converted into an appropriate RGB signal by a signal processing circuit 124 (224), then converted to a driving waveform suited for the display by a display IC 106 (206) and a display driving circuit 107 (207), and displayed on a display part 108 (208).

Incidentally, the series of sequence controls described above are executed by a system controlling CPU 115 (215) in accordance with the program stored in advance by a ROM 116 (216), by using a RAM 117 (217) as a work memory.

Next, here will be described the operation when the digital image signal thus stored in the internal memory 105 of the first apparatus 1 is transferred to the second apparatus 2.

Specifically, first, when the second apparatus 2 is in a standby state, that is it can receive data, and when the data transfer mode is set by the user using an operation part 109 of the first apparatus 1 comprising a change-over switch of the like, the digital image signal stored in the internal memory 105 is read out from the memory controller 104.

The digital image signal thus read but is fed to a data transfer I/F 110, converted into codes suitable for data transfer, given an address control code, and sent to a parallel/serial conversion circuit 111.

Here, as shown in FIG. 5, it is detected by a detecting circuit 120 of FIG. 3 whether the first apparatus 1 is in a position A, i.e., in a state close to or in contact with the second apparatus 2, or in a position B, i.e., in a state apart from the second apparatus 2.

This state, in which the first apparatus 1 and the second apparatus 2 are spaced from each other, is detected by doing simulated communication before actually transferring the digital image signal from the first apparatus 1 to the second apparatus 2. Incidentally, the details of this detecting method will be described later.

A signal s1 representing the separated state detected by the detecting circuit 120 is fed to the system controlling CPU 115. By this system controlling CPU 115, the parallel/serial conversion circuit 111 is controlled on the basis of the fed detection signal s1, and the transfer state of the digital image signal is switched, as follows.

Specifically, when the first apparatus 1 and the second apparatus 2 are in the close or contact state, the digital image signal is converted into parallel data. When the first apparatus 1 and the second apparatus 2 are in the separate state, the digital image signal is converted into serial data.

At this time, by informing the user of the transfer state by displaying the transfer state which is switched in response to the aforementioned detection signal s1, and the time period required to transfer and write data on at least one of the display parts 108 and 208 of the first and second apparatus 1 and 2, the convenience of operation of the apparatuses can be improved.

Next, the digital image signal thus converted into parallel data or serial data is converted by a light emitting/receiving system driving circuit 112 into an electric current suited for driving an array 113 of light emitting elements Such as of infrared light emitting diodes. And, the electric signal thus converted is transferred as a signal of light such as an infrared ray from the light emitting element array 113 of the first apparatus 1 to the second apparatus 2.

On the side of the second apparatus 2, the light signal thus sent from the first apparatus 1 is received by an array 214 of light receiving elements such as photodiodes, and photo-electrically converted. The electric signal thus obtained by the photoelectric conversion is amplified by a light emitting/receiving system driving circuit 212 and its waveform shaped by the not-shown shaping circuit.

Moreover, the parallel/serial conversion circuit 211 is controlled by the system controlling CPU 215 to effect the following data conversion on the basis of a signal s2 representing the separated position state detected by a detecting circuit 220 as by the aforementioned detecting circuit 120.

In short, when it is detected that the first apparatus 1 is in a position apart from the second apparatus 2, the digital image signal transferred from the first apparatus 1 is converted from serial data into parallel data. On the other hand, when it is detected that the first apparatus 1 is close to or in contact with the second apparatus 2, the digital image signal transferred from the first apparatus 1 is not converted but is left as the parallel data.

The digital image signal of 8 or 10 bits thus converted by the parallel/serial conversion circuit 211 is subjected by a data transfer I/F 210 to a reverse processing to the processing of the data transfer I/F 110 of the first apparatus 1 so that it is converted into codes suited for the internal processing of the second apparatus 2.

The digital image signal thus code-converted is stored in a predetermined storage area of the internal memory 205 by the control of the memory controller 204, and simultaneously the waveform is shaped into drive waveform suited for the display by the display IC 206 and the display driving circuit 207, and displayed on the display part 208.

When it is necessary to record the digital image signal thus transferred as a file, the digital image signal is stored in the external memory 201 through the memory I/F 203 in accordance with the operation of an operation part 209 by the user.

With reference to FIGS. 6 to 9, here will be described the operation principle of the aforementioned detecting circuits 120 and 220.

Here, FIG. 6 is a section of the light signal transmission means and shows the positional relations of the light receiving element array 214 to the emitted light beams of the light emitting element array 113 when the first apparatus 1 is in the position B where it is apart form the second apparatus 2, as shown in FIG. 5.

Moreover, FIG. 7 is a section of the light signal transmission means and shows the positional relations of the light receiving element array 214 to the emitted light beams of the light emitting element array 113 when the first apparatus 1 is in the position A where it is close to or in contact with the second apparatus 2, as shown in FIG. 5. FIG. 8 is a perspective view of the light signal transmission means shown in FIGS. 6 and 7.

In FIGS. 6 to 8, reference symbols D10 to D13 designate the light emitting elements such as the infrared light emitting diodes constituting the light emitting element array 113 of the first apparatus 1 and reference S20 to S23 designate the light receiving elements such as the photodiodes constituting the light receiving element array 214 of the second apparatus 2 and paired with the light emitting elements D10 to D13, respectively.

Reference numerals 11 and 21 designate boards on which the light emitting elements D10 to D13 and the light receiving elements S20 to S23 are mounted, respectively, numerals 12 and 22 holder cases, numerals 13 and 23 visible light cutting filters, numerals 14 and 24 the exterior parts of the apparatus, numerals 15 and 25 the chassis of the apparatus bodies and numerals 16 and 26 fixtures for fixing the holder cases 12, 22 to the chassis 15 and 25, respectively.

The board 11 and the visible light cutting filter 13 of the first apparatus 1 are fixed by the holder case 12, which in turn is fixed to the chassis 15 of the apparatus body by the fixture 16. The holder case 12 is provided with light shielding parts 12a between the respective light emitting elements D10 to D13 and 22a between the respective light receiving elements S10 to S13 so as to prevent optical interference between those adjacent elements. The second apparatus 2 is similarly structured.

Incidentally, the present embodiment has the element arrays composed of four pairs of light emitting elements and four pairs of light receiving elements, as shown in FIGS. 6 to 8. The number of element arrays can be set according to the bit construction and the transfer rate of the digital signal.

When the data communication is wirelessly effected by using light signals, the angle of directivity of the emitted light beams of the light emitting elements is set large so that the communication can be accomplished over a considerably wide area.

Therefore, when the first apparatus 1 and the second apparatus 2 are apart from each other, as shown in FIG. 6, the light beams from adjoining light emitting elements D10 to D13 overlap as shown by hatched parts in FIG. 6. However, as the distance between the first apparatus 1 and the second apparatus 2 is made shorter, overlap of the light beams of the adjoining light emitting elements D10 to D13 disappears, as shown in FIG. 7. Thus, if the overlap of the emitted light beams of the individual light emitting elements D10 to D13 is detected, the distance between the first apparatus 1 and the second apparatus 2 can be detected.

With reference to FIG. 9, here will be described in detail the principle of detecting the spaced positional state of the apparatuses in accordance with the presence or absence of the overlap of the light beams of the individual light emitting elements D10 to D13.

Incidentally, FIG. 9 is a diagram illustrating the waveform of a signal which is obtained by photoelectrical conversion of the light receiving element when a rectangular wave signal is fed to only the light emitting element D10 while the first apparatus 1 and the second apparatus 2 shown in FIG. 6 or 7 are in separate state.

As is apparent from FIG. 9, considerably large amounts of emitted light beams coming from the light emitting element D10 reaches not only the light receiving element S20 but also the light receiving element S21 in the separate positional state shown in FIG. 6, a photocurrent Ip obtained by the photoelectric conversion of the light receiving element S21 takes a considerably large value. As a result, the difference (the hatched part in FIG. 9) in the photocurrents Ip obtained by the light emitting elements S20 and S21 is a small value.

In the close positional state shown in FIG. 7, on the contrary, little amount of light from the light emitting element D10 reaches the light receiving element S21, so that the photocurrent Ip obtained by the photoelectric conversion of the light receiving element S21 takes a small value. As a result, the difference in the photocurrents Ip obtained by the light receiving elements S20 and S21 is a considerably large value.

If, therefore, the aforementioned difference in the photocurrents Ip is larger than a predetermined threshold value, it can be said that no interference with the emitted light beams from the adjacent light emitting elements takes place. If, on the contrary, the difference in the photocurrents Ip is smaller than the predetermined threshold value, it can be said that interference with the emitted light beams from the adjacent light emitting elements takes place.

In short, the positional state of the distance between the first apparatus 1 and the second apparatus 2 can be detected by detecting whether or not the aforementioned difference in the photocurrents Ip exceeds the predetermined threshold value. The detecting circuits 120 and 220 of this embodiment are capable of detecting the positional state of the distance between the apparatuses by making use of this principle.

Incidentally, in cases where the emitted light beams of the light emitting elements D10 to D13 are overlapped, as shown in FIG. 6, the reliability of information transmission is much degraded. In this case, therefore, it is not desirable to effect parallel communication by using the plurality of light emitting elements D10 to D13.

However, if there is no overlap of the emitted light beams of the light emitting elements D10 to D13, as shown in FIG. 7, parallel communication can be effected because the reliability of the information transmission is not degraded. In the case of FIG. 7, therefore, the transfer rate can be increased by parallel communication. In the embodiment, therefore, either serial communication or parallel communication is selected to transfer a digital image signal in accordance with the result of detection of the detecting circuits 120, 220.

With reference to FIGS. 3, 4 and 10, here will be described one embodiment of the protocol of optical communication when digital image signals are transferred from the first apparatus 1 to the second apparatus 2.

First of all, a start signal for reporting the start of optical communication is transmitted from the light emitting element array 113 of the first apparatus 1 to the light receiving element array 214 of the second apparatus 2. Simultaneously, the Gain is adjusted to produce an appropriate output in the light emitting/receiving system driving circuit 212.

Next, the second apparatus 2 having received the start signal transmits a communication-ready flag to the light receiving element array 114 of the first apparatus 1 from the light emitting element array 213 of the second apparatus 2. Receiving this communication-ready flag, the light receiving element array 114 of the first apparatus 1 starts the following communication.

Specifically, the first apparatus 1 having received the communication-ready flag transmits a serial-parallel (S-P) detection signal to the light receiving element array 214 of the second apparatus 2 from the light emitting element array 113 of the first apparatus 1 in accordance with a predetermined rule so as to determine whether the digital image signal is to be transmitted as serial data or parallel data. In the embodiment, as shown in FIG. 10, the light emitting elements D10 to D13 of the light emitting element array 113 are sequentially caused to emit light to transmit the aforementioned S-P detection signal to the light receiving element array 214 of the second apparatus 2.

Upon receiving the S-P detection signal, the second apparatus 2 determines the data transfer method with its detecting circuit 220 by using the aforementioned S-P detection signal on the basis of the aforementioned principle. Then, an S-P confirmation flag conforming to the determined data transfer method is transmitted from the light emitting element array 213 of the second apparatus 2 to the light receiving element array 114 of the first apparatus 1.

At this time, the S-P confirmation flag is not transmitted when the digital image signal is transmitted as the parallel data, but the pulsating S-P confirmation flag is transmitted to the first apparatus 1 from the second apparatus 2 when the digital image signal is transmitted as the serial data. Incidentally, the aforementioned S-P confirmation flag may be of any format as long as whether the digital image signal is transmitted as parallel data or serial data can be judged.

Next, the detection signal s1 on the basis of the S-P confirmation flag received by the light receiving element array 114 is fed through the detecting circuit 120 to the system controlling CPU 115. On the basis of the detection signal s1, the system controlling CPU 115 controls the parallel/serial conversion circuit 111 to convert the digital image signal into the form of parallel data or serial data. Then, the digital image signal thus converted is transferred from the light emitting element array 113 of the first apparatus 1 to the light receiving element array 214 of the second apparatus 2.

As has been described hereinbefore, in the first embodiment, the digital image signal is transferred as the parallel data through the four pairs of light emitting elements D10 to D13 and light receiving elements S20 to S23 when the first apparatus 1 and the second apparatus 2 are close to or in contact with each other. As a result, the time period t required to transfer the data through serial communication can be reduced to t/4 at the longest when transferring the data through parallel communication, so that the data transfer rate can be increased.

Thus, in the state in which the first apparatus 1 and the second apparatus 2 are close to or in contact with each other, no crosstalk occurs in the emitted light beams coming from the adjacent light emitting elements, so that the reliability of the information transmission can be prevented from dropping. Neither the data compression ratio need to be increased more than necessary nor need the amount of information processed per unit time be decreased. As a result, images can be transferred not only at a high rate but also reliably with a high quality.

Since, moreover, the transfer state of serial communication or parallel communication can be selected on the basis of the detection outputs s1 and s2 of the detecting circuits 120 and 220, the operability of the apparatus can be remarkably excellent.

Referring to FIGS. 11 to 18, here will be described a second embodiment of the apparatus having the light signal transmission means according to the present invention.

Figure 11:
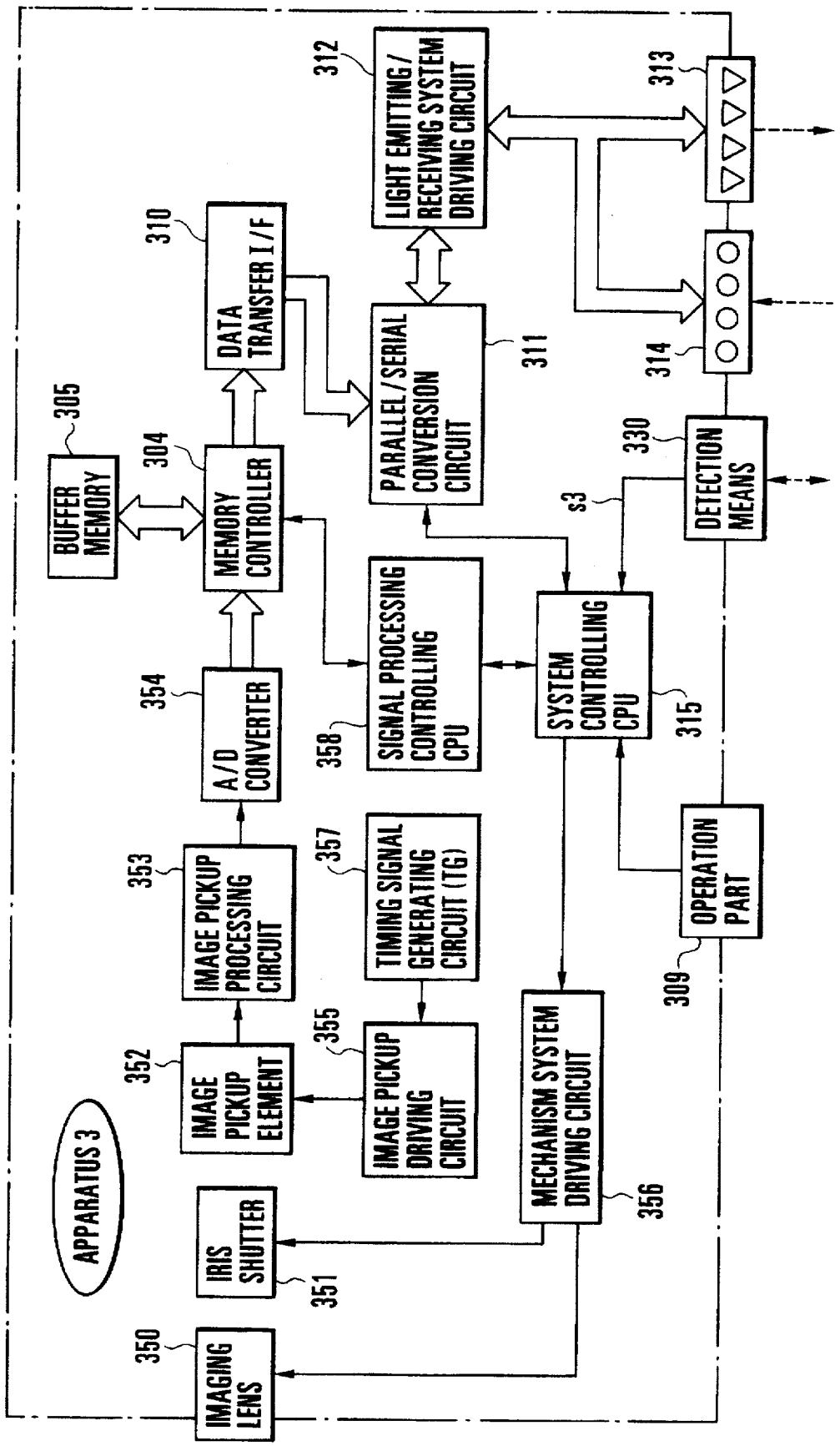
FIG. 11 is a circuit block diagram of a camera head (third apparatus) according to a second embodiment of the present invention.
Figure 12:
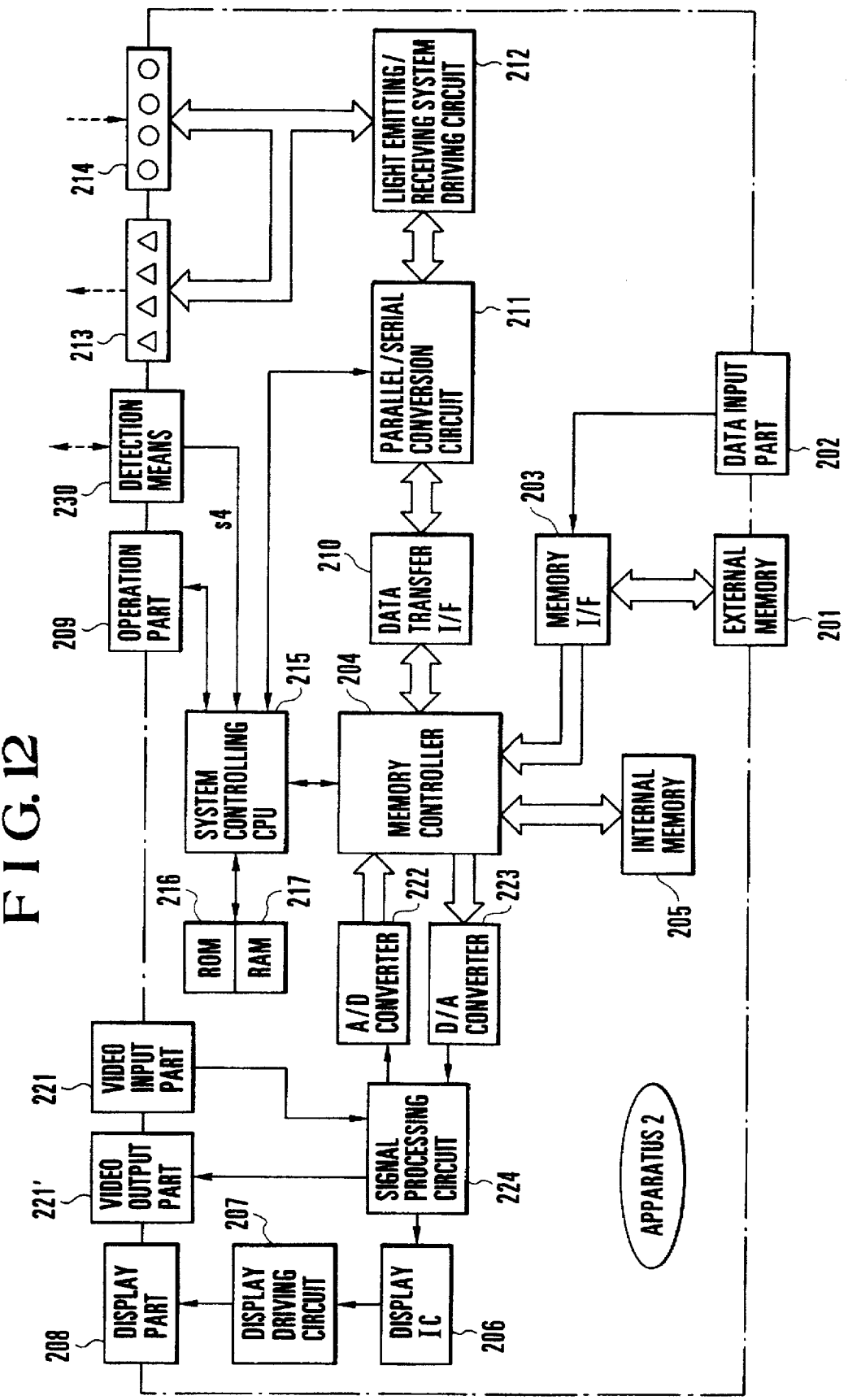
FIG. 12 is a circuit block diagram of an information processing apparatus (the second apparatus) according to the second embodiment of the present invention.
Figure 13:
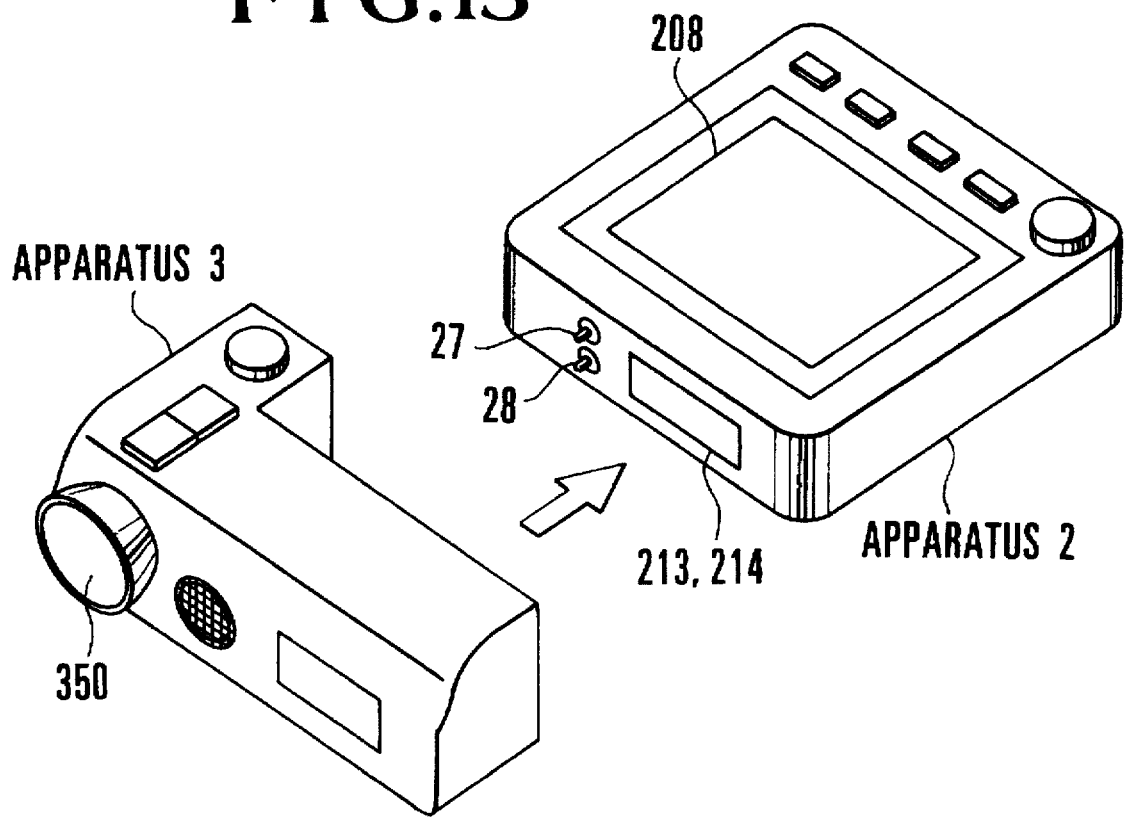
FIG. 13 is an appearance perspective view showing the third apparatus and the second apparatus shown in FIGS. 11 and 12 respectively, before they are assembled.
Figure 14:
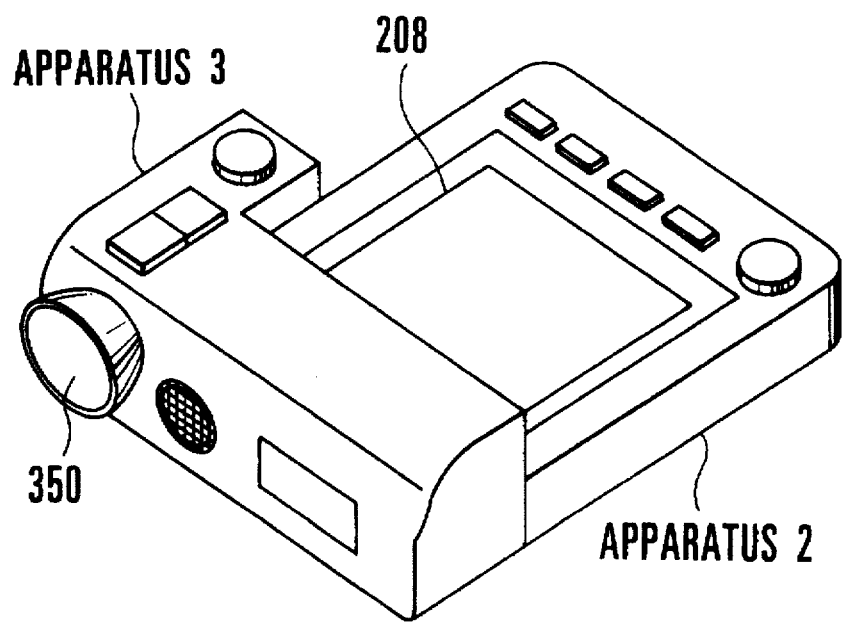
FIG. 14 is an appearance perspective view showing the third apparatus and the second apparatus shown in FIGS. 11 and 12 respectively, after they are assembled.

FIG. 11 is a circuit block diagram of a camera head (third apparatus 3) according to the present invention, FIG. 12 is a circuit block diagram of an information processing apparatus (second apparatus 2) according to the present invention, and FIGS. 13 and 14 are appearance perspective views showing the aforementioned third apparatus 3 and second apparatus 2 before and after they are assembled.

Figure 15:
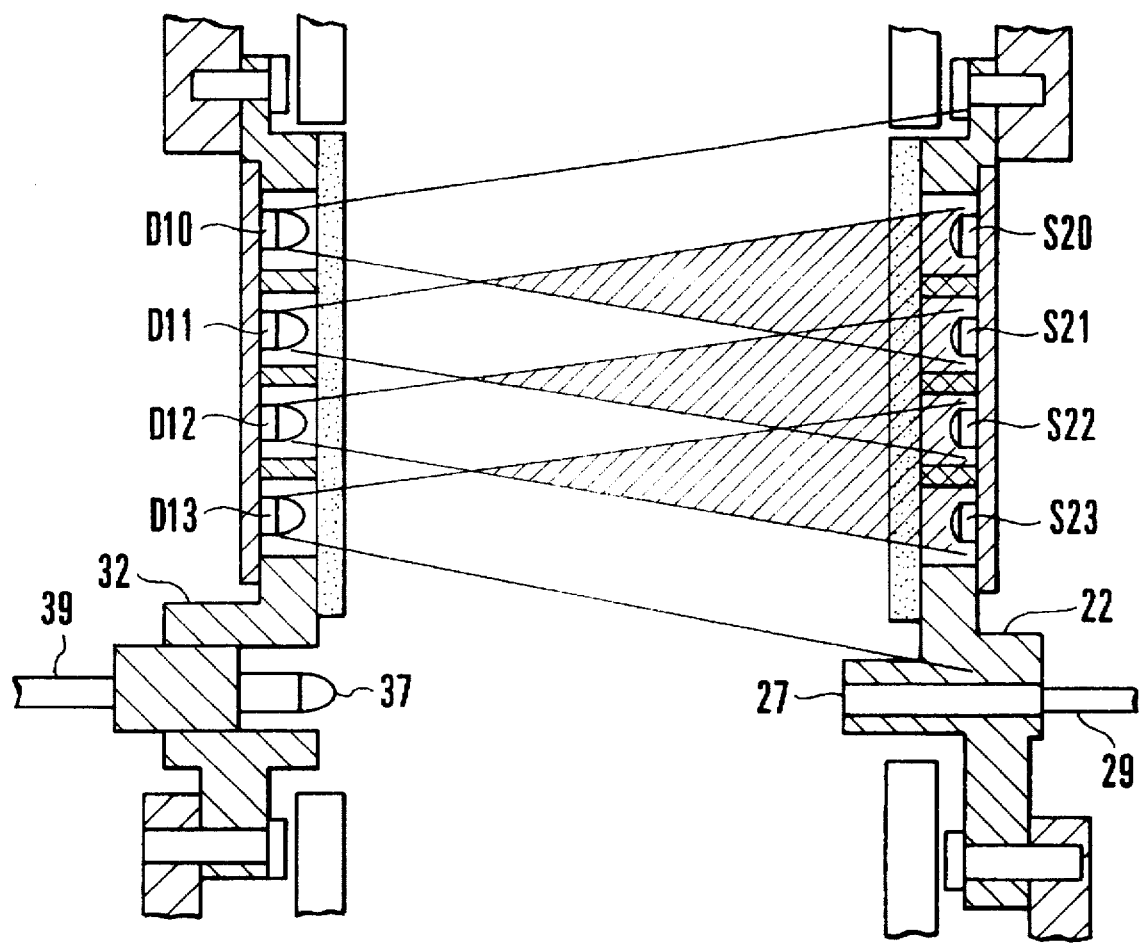
FIG. 15 is a section of light signal transmission means and shows the positional relations and position detecting means of the light receiving elements to the emitted light beams of light emitting elements in accordance with the distance between the third apparatus and the second apparatus shown in FIG. 13.
Figure 16:
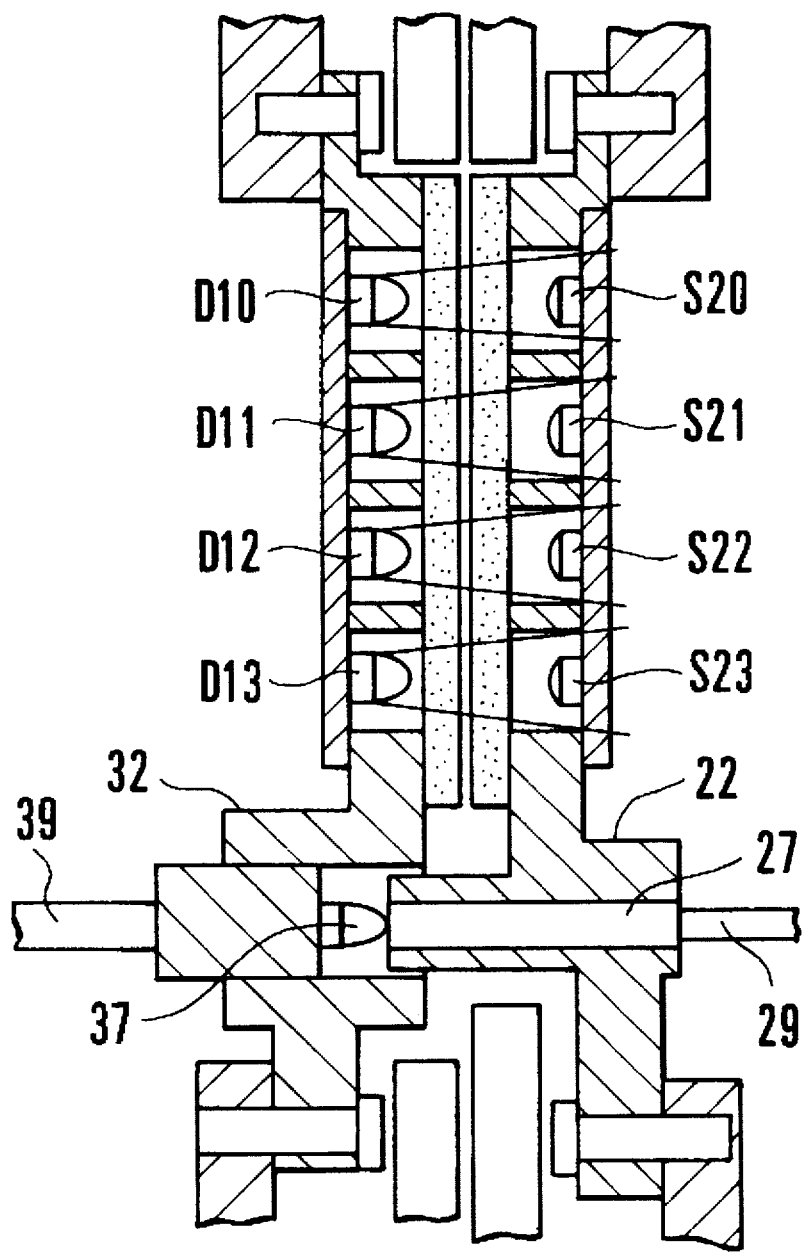
FIG. 16 is a section of light signal transmission means and shows the positional relations and position detecting means of the light receiving elements to the emitted light beams of light emitting elements in accordance with the distance between the third apparatus and the second apparatus shown in FIG. 14.
Figure 17:
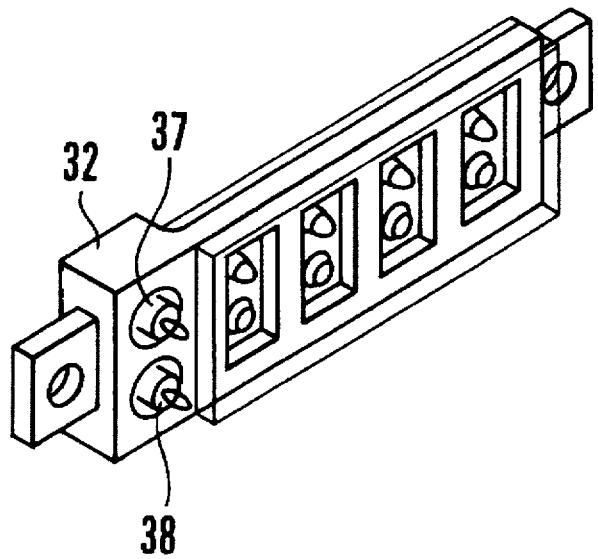
FIG. 17 is a perspective view of the light signal transmission means according to the second embodiment.
Figure 18:
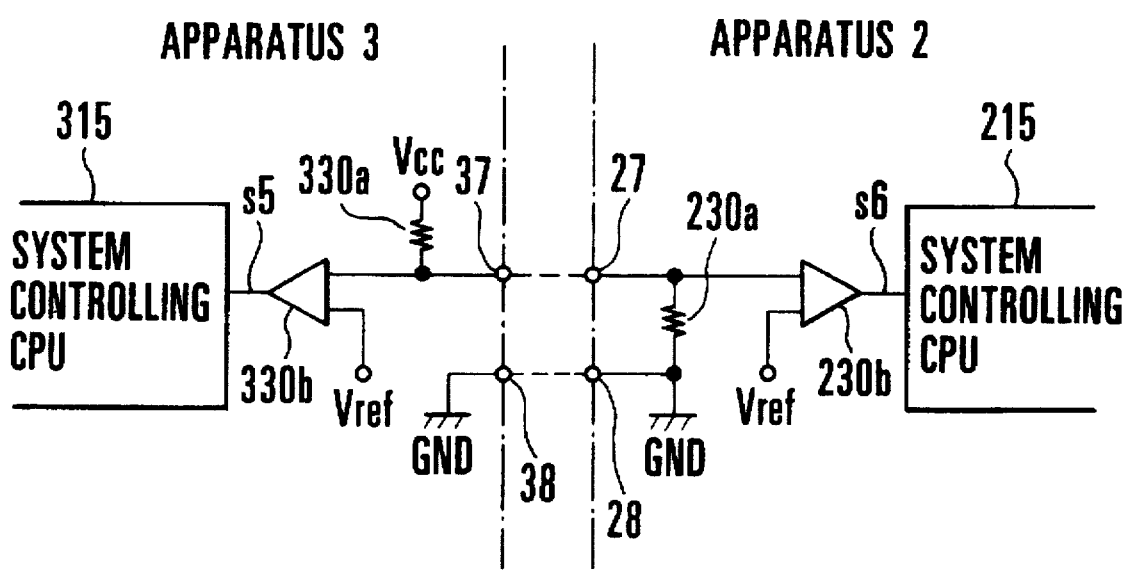
FIG. 18 is a block diagram showing a circuit part of the position detecting means according to the second embodiment.

FIGS. 15 and 16 are sections of the light signal transmission means and the position detecting means and show the positional relations of the light receiving elements to the emitted light beams of light emitting elements in accordance with the distance between the third apparatus 3 and the second apparatus 2 shown in FIGS. 13 and 14, FIG. 17 is a perspective view of the light signal transmission means and the position detecting means of the present embodiment, and FIG. 18 is a circuit block diagram of the position detecting means.

The second embodiment described in the following is such that a personal information processing apparatus (e.g., a handy personal computer) is used in the mode in which information is inputted/outputted from/to a plurality of apparatus, and these apparatus are coupled to each other.

In the following second embodiment, means for transmitting signals, with the apparatuses coupled to each other is so constructed as to serve also as a light transmission interface part. The size and manufacturing cost of the apparatus can be consequently reduced, and the signal can be transmitted while the apparatuses are out of contact with one another, to improve the reliability of the signal transmission.

In addition, even if the camera head (the third apparatus 3) and the information processing apparatus (the second apparatus 2) are placed apart from each other, as shown in FIG. 13, the image signal can be wirelessly transmitted from the camera head to the information processing apparatus. Such apparatus can be used in various applications, as a monitor camera, a TV telephone camera, or the like.

In FIG. 12, the structure and operation of the information processing apparatus, the second apparatus 2 are identical with those of the information processing apparatus or the second apparatus 2 of the first embodiment except the detection means 230. The construction and operation of this detection means 230 will be described later. In FIG. 11, moreover, the camera head or the third apparatus 3 has the following operation.

Specifically, after the (not-shown) image-pickup start trigger switch in an operation part 309 is turned on at first by the user, the exposure is adequately adjusted by an iris shutter 351 driven by a mechanism system drive circuit 356, and an object image having passed through an imaging lens 350 is projected onto an image pickup element 352.

Then, the object image is photoelectrically converted by the image pickup element 352, and the resultant signal is fed as an image signal to an image pickup processing circuit 353. Incidentally, the image pickup element 352 is driven and controlled by an image pickup driving circuit 355 on the basis of a drive pulse generated by a timing signal generating circuit (TG) 357.

In the image pickup processing circuit 353, the input image signal is subjected to gain adjustment, gamma correction and color separation (to generate Y signal and R-Y/B-Y signal) and the level and characteristics are adjusted to required ones. The image signal thus processed is converted by an A/D converter 354 into a digital signal of 8 or 10 bits and is then written in the form of binary digital signal in a predetermined area of a buffer memory 305 under the control of a memory controller 304.

When the digital image signal thus written in the buffer memory 305 is transferred from the third apparatus 3 to the second apparatus 2, the digital image signal is read out of the buffer memory 305 by the memory controller 304. The digital image signal thus read out is converted into appropriate codes when the data is transferred by a data transfer I/F 310, and an address control code and others are attached. Then the resultant signal is transmitted to a parallel/serial conversion circuit 311.

This parallel/serial conversion circuit 311 is controlled by a system controlling CPU 315 on the basis of such a detection signal s3 representing the separated positional state of the third apparatus 3 and the second apparatus 2 detected by detection means 330. Moreover, the digital image signal thus fed to the parallel/serial conversion circuit 311 is converted into either parallel data or serial data.

Next, the digital image signal thus converted into the parallel data or the serial data is converted by a light emitting/receiving system driving circuit 312 into a current suited for driving a light emitting element array 313 comprising infrared light emitting diodes. The electric signal thus converted is transferred as a signal of light such as infrared light to the second apparatus 2 from the light emitting element array 313 of the third apparatus 3.

The various processings of the digital image signal subsequently carried out in the second apparatus 2 are similar to those in the second apparatus 2 of the aforementioned first embodiment.

Incidentally, the series of the aforementioned sequential controls are carried out by the system controlling CPU 315 and a signal processing controlling CPU 358 on the side of the third apparatus 3 and by the system controlling CPU 215 on the side of the second apparatus 2.

In the embodiment, as described above, the detection means 230 and 330 for detecting the separate positional state of the third apparatus 3 and the second apparatus 2 so as to switch the serial data and the parallel data are different from the detecting circuits 120 and 220 described in the first embodiment. The structures of those detection means 230 and 330 are shown in FIGS. 15 to 17.

In the third apparatus 3, as shown in FIGS. 15 to 17, expandable pin headers 37 and 38 are buried in a holder case 32 forming part of the light signal transmitting means. These pin headers 37 and 38 are connected through lead wires 39 to a (not-shown) circuit board constituting a detecting circuit part of a position detecting means.

In the second apparatus 2, on the other hand, there are buried in the holder case 22 connection terminals 27 and 28 electrically connected to the pin headers 37 and 38 when the third apparatus 3 and the second apparatus 2 are assembled into one unit. These connection terminals 27 and 28 are connected through lead wires 29 to a (not-shown) circuit board constituting a detecting circuit part of a position detecting means.

The aforementioned detecting circuit part is constructed, as shown in FIG. 18. While the third apparatus 3 and the second apparatus 2 shown in FIGS. 13 and 15 are apart from each other, as is apparent from FIG. 18, the voltage at the second apparatus 2 is pulled up to a supply voltage $V_{cc}$, and the voltage at the second apparatus 2 is pulled down to a ground voltage GND.

On the side of the third apparatus 3, the supply voltage $V_{cc}$ is compared with a reference voltage $V_{ref}$ by a comparator 330b, and a comparison signal s5 obtained as a result of this comparison is fed to the system controlling CPU 315. On the side of the second apparatus 2, on the other hand, the ground voltage GND is compared with the reference voltage $V_{ref}$ by a comparator 230b, and a comparison signal s6 obtained as a result of this comparison is fed to the system controlling CPU 215.

On the basis of the comparison signals s5 and s6, the system controlling CPU 315 and 215 detect that the connection terminals 27 and 28 are not electrically connected to the respective pin headers 37 and 38, namely, that the third apparatus 3 and the second apparatus 2 are not coupled to each other. In accordance with this detection result, the system controlling CPU 315 controls the parallel/serial conversion circuit 311 to transfer the digital image signal in the form of serial data from the third apparatus 3 to the second apparatus 2.

On the other hand, when the third apparatus 3 and the second apparatus 2 are coupled and connected to each other, as shown in FIGS. 14 and 16, the connection terminals 27 and 28 are electrically connected to the respective pin headers 37 and 38. As a result, the voltage applied to one input terminal of each of the comparators 230b and 330b takes such the voltage divided by a pull-down resistor 230a and a pull-up resistor 330a.

The divided voltage applied to one input terminal of the comparators 230b and 330b is compared with the reference voltage $V_{ref}$ applied to the other input terminal, and the comparison signals s5 and s6 obtained as a result of this comparison are respectively fed to the system controlling CPUs 215 and 315.

On the basis of these comparison signals s5 and s6, the system controlling CPUs 315 and 215 detect that the individual connection terminals 27 and 28 are electrically connected to the respective pin headers 37 and 38, namely, that the third apparatus 3 and the second apparatus 2 are assembled into one unit. In accordance with this detection result, the system controlling CPU 315 controls the parallel/serial conversion circuit 311 to transfer the digital image signal in the form of parallel data at a high rate from the third apparatus 3 to the second apparatus 2.

The gist of the present invention is not changed in the least even if the separate positional state of the apparatuses is detected not by the simulated communication of the first embodiment but by using a detection means by an electrical connection method using the connection terminals, as in the second embodiment.

The separated positional state of the apparatuses may be detected by using a detection means by a mechanical connection method of switching on/off the push switch disposed in at least one of the apparatuses according to whether or not the apparatuses are assembled and connected.

Figure 19:
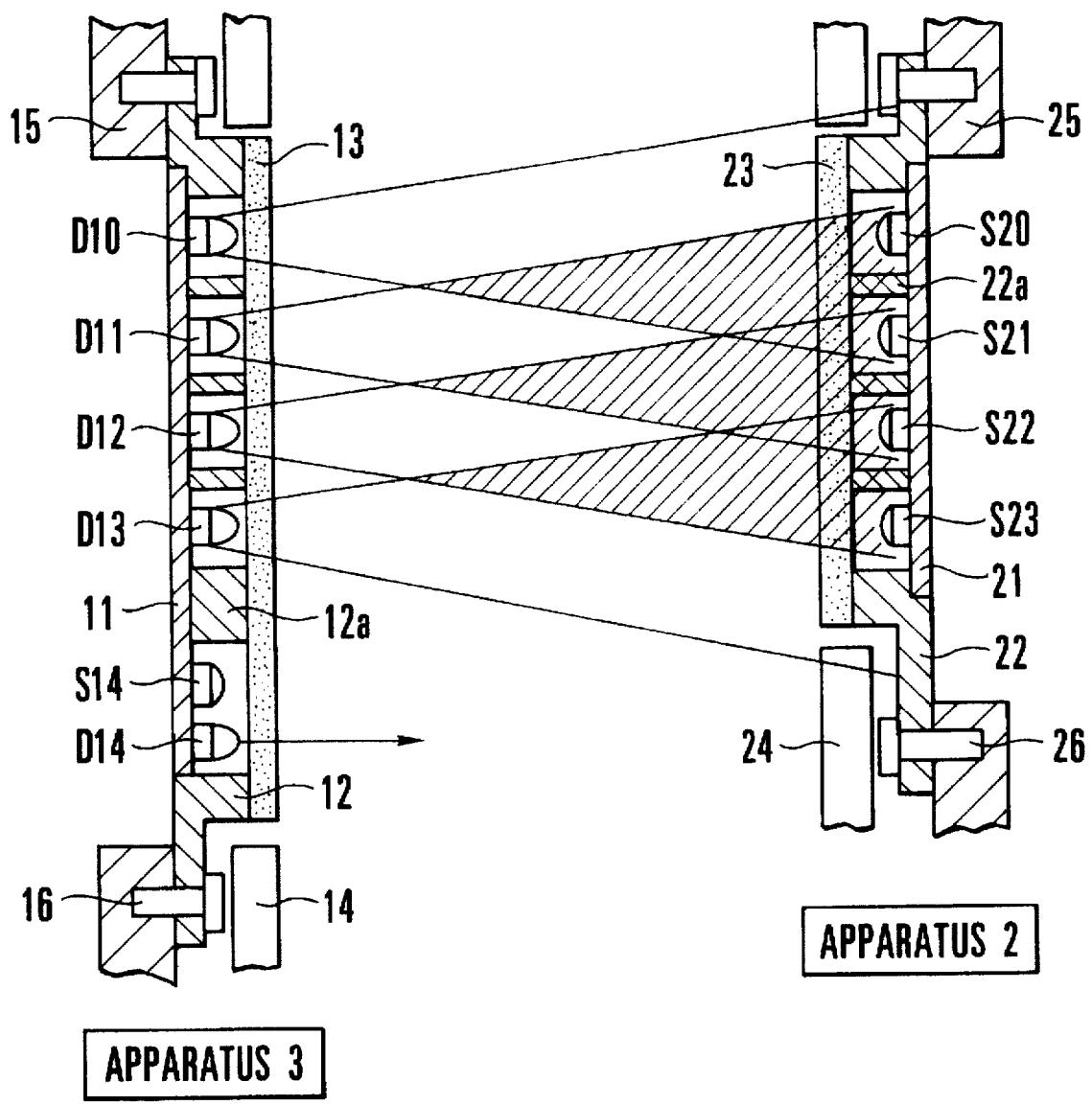
FIG. 19 is a section showing another example of the construction of the position detecting means according to a third embodiment.
Figure 20:
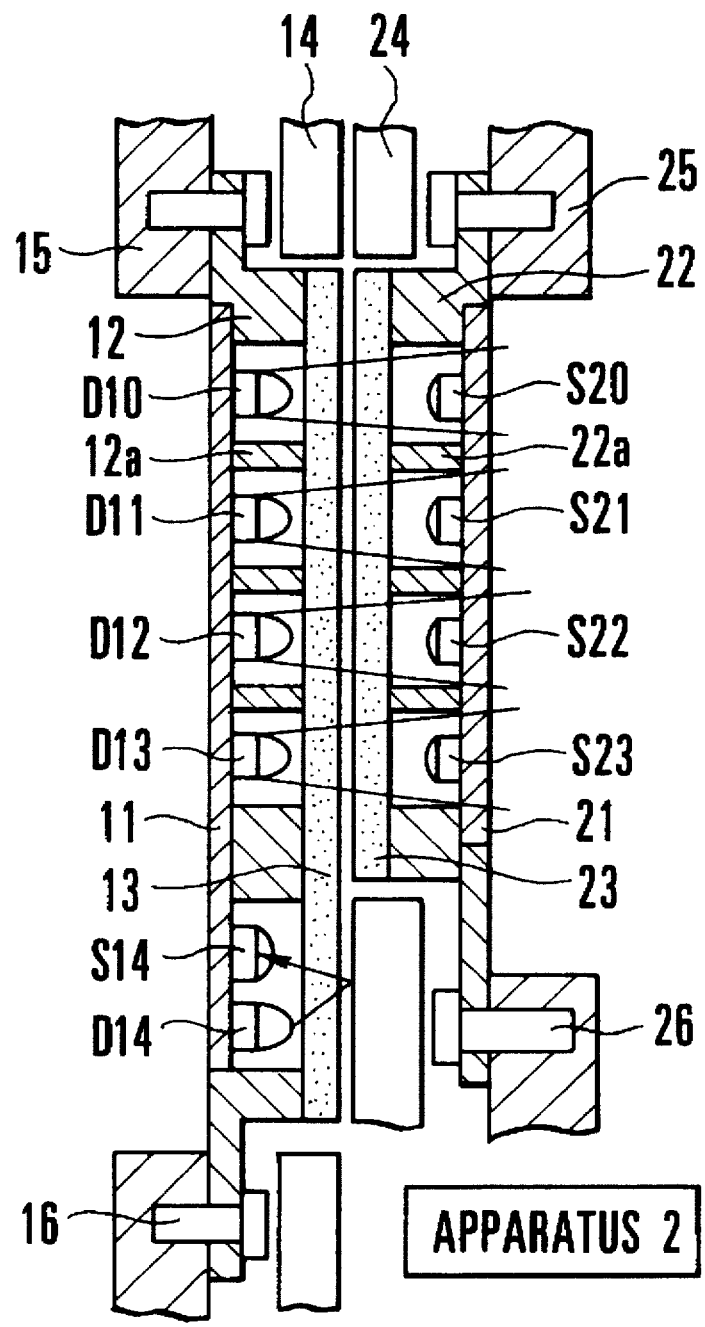
FIG. 20 is a section showing another example of the construction of the position detecting means according to the third embodiment.

Next, a third example of the structure of the position detecting means is shown in FIGS. 19 and 20. The parts appearing in FIGS. 29 and 20 with the same reference numerals as those of FIGS. 6 and 7 designate the identical parts. Reference symbol D14 designates a light emitting element such as an infrared light emitting diode, and reference symbol S14 designates a light receiving element such as a photodiode.

These light emitting element D14 and light receiving element S14 are disposed on the board 11 in the third apparatus 3 below the light emitting elements D10 to D13. These light emitting element D14 and light receiving element S14 are located at the position corresponding to the exterior part 24 of the second apparatus 2.

The light emitting element D14 and the light receiving element S14 are so provided that optical interference with the light emitting elements D10 to D13 is prevented by the light-shielding part 12a. Incidentally, no light shielding portion 12a is provided between the light emitting element D14 and the light receiving element S14.

Here will be described a method of detecting the separate positional state of the apparatuses by the position detecting means thus constructed.

When the third apparatus 3 and the second apparatus 2 are separated from each other, as shown in FIG. 19, no object is present in front of the light emitting element D14 of the third apparatus 3, so that there is no reflection of light emitted from the light emitting element D14. As a result, no light is incident upon the light receiving element S14.

On the other hand, when the third apparatus 3 and the second apparatus 2 are assembled and connected to each other, as shown in FIG. 20, the exterior part 24 of the second apparatus 2 is present just in front of the light emitting element D14 of the third apparatus 3. As a result, light emitted from the light emitting element D14 is reflected from the wall face of the exterior part 24 so that reflected light Goes into the light receiving element S14 of the third apparatus 3. As a result, the separated positional state of the third apparatus 3 and the second apparatus 2 can be detected by detecting the level of the light signal which is obtained by the photoelectric conversion of the light receiving element S14.

Even in the third embodiment, as in the second embodiment, the size and manufacturing cost of the apparatuses can can be reduced and signals can be transmitted contactlessly, so that the reliability of the signal transmission can be improved.

Incidentally, the foregoing embodiments employ the light emitting elements and the light receiving elements using light as the spatial communication means of the present invention, but this spatial communication means should not be limited thereto but includes all the wireless communication means using electromagnetic waves and sound waves.

According to the present invention, as has been described hereinbefore, a detection means for detecting the separated positional state of the communication apparatus is provided, so that the communication method of the communication means may be changed according to the detection result of the detection means. As a result, when one communication apparatus and another communication apparatus are close to each other or in contact with each other and the reliability of information transmission is not degraded the data can be transferred by a communication method capable of transferring the signal at high speed, thereby to shorten the transfer time. As a result, the data can be transferred at high speed without increasing the data compression ratio more than necessary and without reducing the amount of information processed per unit time, and massive data such as of a high quality image can be transferred quickly and reliably.

At this time, since the signal communication method can be automatically switched according to the detection result of the detection means, the method need not be manually switched by the user and the operability of the apparatuses is drastically improved.

Another feature of the present invention is that since no large-scale circuit need not be additionally provided as a detection means, small apparatuses can be manufactured at very low cost without complicating the electric circuit and mounting structure.

Still another feature of the present invention is that since the data communication method is switched from a serial data communication method to a parallel data communication method when it is detected that one communication apparatus and another communication apparatus are close to each other or in contact with each other, a plurality of data can be simultaneously transferred merely by devising the arrangement of the two communication apparatuses and the transfer time can be accordingly shortened to transfer massive data quickly and reliably.

What is claimed is:

1. A communication apparatus comprising:
   (a) communication means having a transmission part and/or a reception part;
   (b) detection means for detecting a characteristic of a state of communication with the apparatus of a partner; and
   (c) control means for controlling said communication means to communicate by a parallel data transfer method in the state that said detection means detects that the characteristic of the state of communication is good and to communicate by a serial data transfer method in the state that said detection means detects the characteristic of the state of communication is bad.

2. A communication apparatus according to claim 1, wherein said detection means detects the characteristic of said communication state in accordance with a communication result of said communication means.

3. An electronic apparatus comprising:
   (a) communication means for communication with another apparatus;
   (b) detection means for detecting the communication distance to said apparatus with which said communication means communicates; and
   (c) control means for controlling said communication means to communicate by a parallel data transfer method in the state that the communication distance is shorter than a predetermined distance and to communicate by a serial data transfer method in the state that the communication distance is longer than the predetermined distance.

4. An electronic apparatus according to claim 3, wherein said detection means detects the communication distance by performing simulated communication in advance by said communication means.

5. An electronic apparatus according to claim 3, wherein said detection means detects the communication distance through terminals electrically connectable to another apparatus.

6. An electronic apparatus according to claim 3, wherein said detection means detects the communication distance mechanically.

7. An electronic apparatus according to claim 3, wherein said detection means includes light emitting means for emitting light, and light receiving means for receiving the light emitted from said light emitting means.

8. An electronic apparatus according to claim 3, further comprising:
   (d) indicating means for indicating the communication state of said communication means.

9. An electronic apparatus according to claim 3, wherein said communication means performs communication through electromagnetic waves.

10. An electronic apparatus according to claim 9, wherein said communication means performs communication through a light.

11. An electronic apparatus according to claim 10, wherein said detection means detects the communication distance according to whether or not the interference of emitted light beams is present.

12. An electronic apparatus according to claim 10, wherein said communication means comprises a plurality of light receiving elements, and said detection means detects the communication distance by measuring the difference between the photocurrent flowing through the first light receiving element and the photocurrent flowing through the second light receiving element.

13. An electronic apparatus according to claim 12, wherein said control means controls the data transfer method to the parallel data transfer method when the difference in the photocurrent measured by said detection means is higher than a predetermined value, and to the serial data transfer method when the same is lower than the predetermined value.

14. A transmitting apparatus comprising:
   (a) transmission means for transmitting a signal to another apparatus;
   (b) detection means for detecting the transmission distance to said apparatus to which said transmission means transmits a signal; and
   (c) control means for controlling said transmission means to communicate by a parallel data transfer method in the state that the communication distance is shorter than a predetermined distance and to communicate by a serial data transfer method in the state that the communication distance is longer than the predetermined distance.

15. A transmitting apparatus according to claim 14, wherein said detection means detects the communication distance by performing simulated transmission in advance by said transmission means.

16. A transmitting apparatus according to claim 14, wherein said detection means detects the communication distance through terminals electrically connectable to another apparatus.

17. A transmitting apparatus according to claim 14, wherein said detection means detects the communication distance mechanically.

18. A transmitting apparatus according to claim 14, wherein said detection means includes light emitting means for emitting light, and light receiving means for receiving the light emitted from said light emitting means.

19. A transmitting apparatus according to claim 14, further comprising:
   (d) indicating means for indicating the communication state of said transmission means.

20. A transmitting apparatus according to claim 14, wherein said transmission means performs the communication through electromagnetic waves.

21. A transmitting apparatus according to claim 20, wherein said transmission means performs the transmission with a light.

22. A receiving apparatus comprising:
   a) reception means for receiving a signal from another apparatus;
   (b) detection means for detecting the transmission distance to the other apparatus from which the reception means receives a signal transmitted by the other apparatus; and
   (c) control means for controlling said reception means to communicate by a parallel data transfer method in the state that the communication distance is shorter than a predetermined distance and to communicate by a serial data transfer method in the state that the communication distance is longer than the predetermined distance.

23. A receiving apparatus according to claim 22, wherein said detection means detects the communication distance through terminals electrically connectable to another apparatus.

24. A receiving apparatus according to claim 22, wherein said detection means detects the communication distance mechanically.

25. A receiving apparatus according to claim 22, wherein said detection means comprises light emitting means for emitting light, and light receiving means for receiving the light emitted from said light emitting means.

26. A receiving apparatus according to claim 22, further comprising:
   (d) indicating means for indicating the transmission state of said reception means.

27. A receiving apparatus according to claim 22, wherein said transmission means performs the reception of a signal through electromagnetic waves.

28. A receiving apparatus according to claim 27, wherein said transmission means performs the reception of a signal through a light.

29. A receiving apparatus according to claim 28, wherein said detection means detects the communication distance according to whether or not the interference of emitted light beams is present.

30. A receiving apparatus according to claim 28, wherein said reception means comprises a plurality of light receiving elements, and said detection means detects the communication distance by measuring the difference between the photocurrent flowing through the first light receiving element and the photocurrent flowing through the second light receiving element.

31. A receiving apparatus according to claim 30, wherein said control means controls the data transfer method to the parallel data transfer method when the difference in the photocurrent measured by said detection means is higher than a predetermined value, and to the serial data transfer method when the same is lower than the predetermined value.

32. A receiving apparatus according to claim 32, wherein said detection means detects the communication distance by performing simulated reception in advance by said reception means.

33. A transmitting and receiving apparatus comprising:
   (a) transmission means for transmitting a signal to another apparatus;
   (b) reception means for receiving a signal from the other apparatus;
   (c) detection means for detecting the communication distance to said apparatus to and from which said transmission means transmits and receives a signal; and
   (d) control means for controlling said transmission means for said reception means to communicate by a parallel data information transfer method in the state that the communication distance is shorter than a predetermined distance and to communicate by a serial data transfer method in the state that the communication distance is longer than a predetermined distance.

34. A transmitting and receiving apparatus according to claim 33, wherein said detection means detects the communication distance by performing simulated communication with said another apparatus in advance by said transmission means or said reception means.

35. A transmitting and receiving apparatus according to claim 33, wherein said detection means detects the communication distance through terminals electrically connectable to another apparatus.

36. A transmitting and receiving apparatus according to claim 33, wherein said detection means detects the communication distance mechanically.

37. A transmitting and receiving apparatus according to claim 33, wherein said detection means comprises light emitting means for emitting light, and light receiving means for receiving the light emitted from said light emitting means.

38. A transmitting and receiving apparatus according to further comprising:
   (d) indicating means for indicating the communication state of said transmission means or said reception means.

39. A transmitting and receiving apparatus according to claim 33, wherein said transmission means or said reception means performs communication through electromagnetic waves.

40. A transmitting and receiving apparatus according to claim 39, wherein said transmission means or said reception means performs communication of a signal through light.

41. A transmitting and receiving apparatus according to claim 40, wherein said detection means detects the communication distance according to whether or not interference of emitted light beams is present.

42. A transmitting and receiving apparatus according to claim 41, wherein said control means controls the data transfer method to the parallel data transfer method when the difference in the photocurrent measured by said detection means is higher than a predetermined value, and to the serial data transfer method when the same is lower than the predetermined value.

43. A transmitting and receiving apparatus according to claim 40, wherein said reception means comprises a plurality of light receiving elements, and said detection means detects the communication distance by measuring the difference between the photocurrent flowing through the first light receiving element and the photocurrent flowing through the second light receiving element.

* * * * *

UNITED STATES PATENT AND TRADEMARK OFFICE
CERTIFICATE OF CORRECTION

PATENT NO. : 5,734,328
DATED : March 31, 1998
INVENTOR(S) : Kenichi Shinbori

It is certified that error appears in the above-identified patent and that said Letters Patent is hereby corrected as shown below:

Col. 4, line 61, delete "With" and insert -- with --.

Col. 7, line 58, delete "Such" and insert -- such --.

Col. 10, line 29, delete "Gain" and insert -- gain --.

Col. 11, line 24, delete "to".

Col. 13, line 8, delete "." (first occurrence).

Col. 14, line 47, delete "Goes" and insert -- goes --.

Col. 17, line 55, delete "32" and insert --22 --.

Col. 18, line 31, after "to" insert -- claim 33 --.

Signed and Sealed this

First Day of December, 1998

*Attest:*

BRUCE LEHMAN

*Attesting Officer*  *Commissioner of Patents and Trademarks*